(12) United States Patent
Russell et al.

(10) Patent No.: US 11,145,206 B2
(45) Date of Patent: Oct. 12, 2021

(54) ROADMAP SEGMENTATION FOR ROBOTIC DEVICE COORDINATION

(71) Applicant: Boston Dynamics, Inc., Waltham, MA (US)

(72) Inventors: Jared Russell, Mountain View, CA (US); Geoffrey Lalonde, La Honda, CA (US)

(73) Assignee: Boston Dynamics, Inc., Waltham, MA (US)

( * ) Notice: Subject to any disclaimer, the term of this patent is extended or adjusted under 35 U.S.C. 154(b) by 220 days.

(21) Appl. No.: 16/025,231

(22) Filed: Jul. 2, 2018

(65) Prior Publication Data
US 2018/0321675 A1 Nov. 8, 2018

Related U.S. Application Data

(63) Continuation of application No. 15/231,719, filed on Aug. 8, 2016, now Pat. No. 10,037,029.

(51) Int. Cl.
*G05D 1/02* (2020.01)
*G08G 1/16* (2006.01)
(Continued)

(52) U.S. Cl.
CPC .............. *G08G 1/166* (2013.01); *B60W 30/00* (2013.01); *G01C 21/206* (2013.01); *G01C 21/32* (2013.01);
(Continued)

(58) Field of Classification Search
CPC ...... G08G 1/16–166; G08G 1/22; G08G 1/20; G08G 1/207; G01C 21/3453;
(Continued)

(56) References Cited

U.S. PATENT DOCUMENTS

2009/0062974 A1 3/2009 Tamamoto et al.
2014/0032035 A1 1/2014 Thomson
(Continued)

OTHER PUBLICATIONS

The Wikimedia Foundation, "Motion Planning", Mar. 23, 2016, available via the Internet at en.wikipedia.org/w/index.php?title=Motion_planning&oldid=711580797 (last visited Aug. 15, 2016).
(Continued)

*Primary Examiner* — Spencer D Patton
(74) *Attorney, Agent, or Firm* — Wolf, Greenfield & Sacks, P.C.

(57) ABSTRACT

Systems and methods related to roadmaps for mobile robotic devices are provided. A computing device can determine a roadmap that includes a first intersection associated with first and second edges. The computing device can determine an edge interaction region (EIR) surrounding the first intersection that includes portions of the first and second edges, where a traversal region on the first edge portion can overlap a traversal region on the second edge portion. The computing device can determine first and second sub-edges of the first edge; the first sub-edge within the EIR and the second sub-edge outside the EIR. The computing device can receive a request to determine a route, determine the route specifying travel along the first sub-edge with a first rule set and along the second sub-edge with a second rule set, and provide the route.

23 Claims, 9 Drawing Sheets

(51) Int. Cl.
  *G08G 1/00* (2006.01)
  *G01C 21/32* (2006.01)
  *G01C 21/20* (2006.01)
  *B60W 30/00* (2006.01)

(52) U.S. Cl.
  CPC ......... *G05D 1/0212* (2013.01); *G05D 1/0274* (2013.01); *G05D 1/0289* (2013.01); *G05D 1/0293* (2013.01); *G08G 1/207* (2013.01); *G05D 2201/0216* (2013.01)

(58) Field of Classification Search
  CPC .............. G01C 21/3492; G01C 21/206; G05B 19/41895; G05D 1/0214; G05D 1/0274; G05D 1/0276; G05D 1/0287; G05D 1/0289; G05D 1/0291; G05D 1/0293; G05D 1/0297; G05D 1/0212; G05D 2201/0216; G05D 2201/0206; G05D 2201/0213
  See application file for complete search history.

(56) References Cited

U.S. PATENT DOCUMENTS

| | | |
|---|---|---|
| 2014/0277691 A1 | 9/2014 | Jacobus et al. |
| 2014/0350831 A1* | 11/2014 | Hoffman ............... G05D 1/0027 701/117 |
| 2015/0149023 A1 | 5/2015 | Attard et al. |
| 2015/0202770 A1* | 7/2015 | Patron .................. G06Q 20/386 700/245 |
| 2015/0234386 A1 | 8/2015 | Zini et al. |
| 2017/0017236 A1* | 1/2017 | Song ....................... G08G 1/165 |
| 2017/0113665 A1 | 4/2017 | Mudalige et al. |
| 2017/0285181 A1 | 10/2017 | Zheng et al. |

OTHER PUBLICATIONS

The Wikimedia Foundation, "Robotic Mapping", Apr. 6, 2016, available via the Internet at en.wikipedia.org/w/index.php?title=Robotic_mapping&oldid=713905347 (last visited Aug. 15, 2016).

* cited by examiner

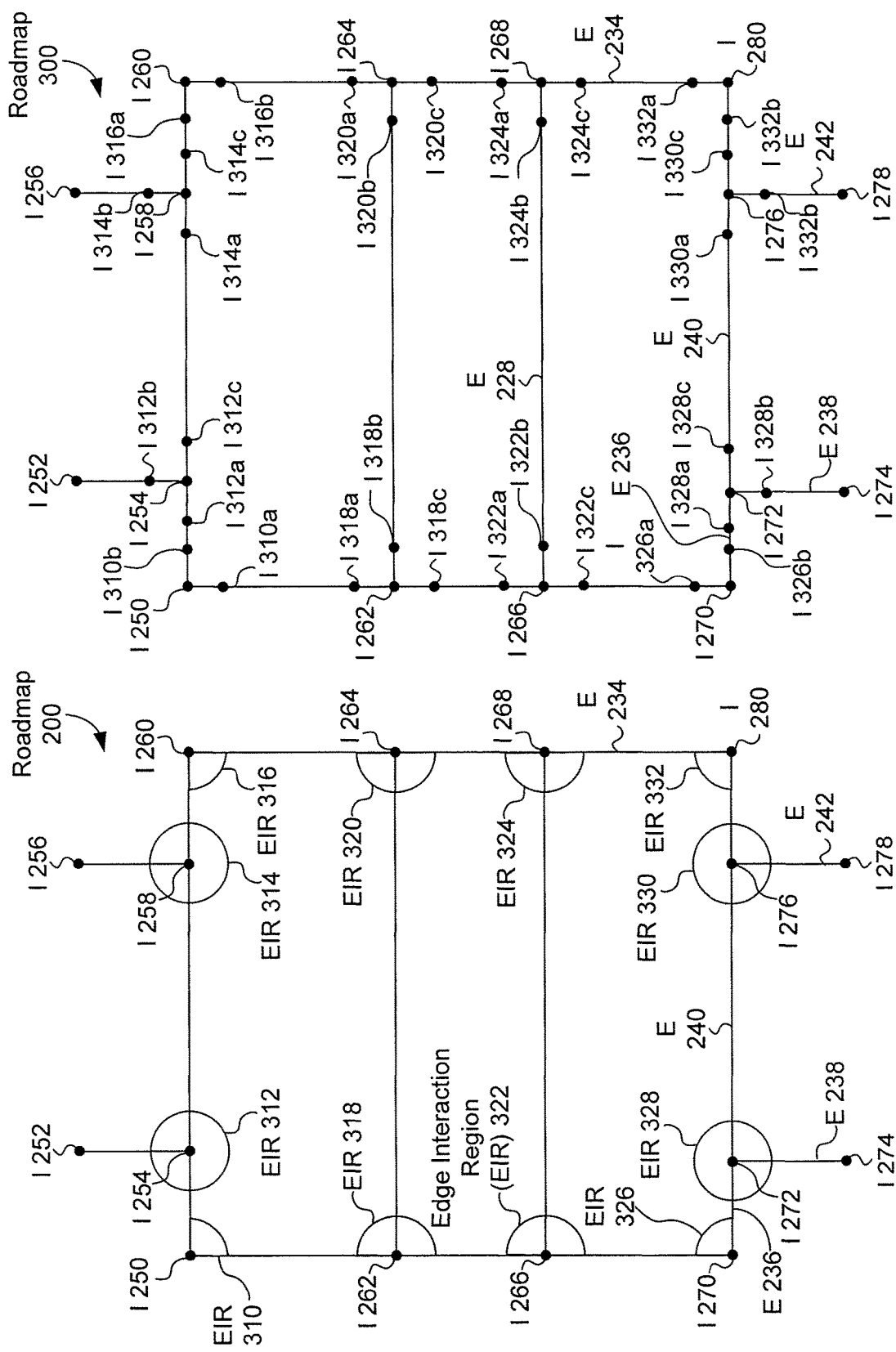

ROADMAP SEGMENTATION FOR ROBOTIC DEVICE COORDINATION

CROSS-REFERENCE TO RELATED APPLICATION

The present disclosure is a continuation of U.S. patent application Ser. No. 15/231,719, filed on Aug. 8, 2016, the entire contents of which are herein incorporated by reference as if fully set forth in this description.

BACKGROUND

One or more robots and/or other actors, such as human actors, can move throughout a space, such as the interior of part or all of a building and/or its surrounding outdoor regions, to perform tasks and/or otherwise utilize the space together. One example of a building is a warehouse, which may be used for storage of goods by a variety of different types of commercial entities, including manufacturers, wholesalers, and transport businesses. Example stored goods may include raw materials, parts or components, packing materials, and finished products. In some cases, the warehouse may be equipped with loading docks to allow goods to be loaded onto and unloaded from delivery trucks or other types of vehicles. The warehouse may also use rows of pallet racks to allow for storages of pallets, flat transport structures that contain stacks of boxes or other objects. Additionally, the warehouse may use machines or vehicles for lifting and moving goods or pallets of goods, such as cranes and forklifts. Human operators may be employed in the warehouse to operate machines, vehicles, and other equipment. In some cases, one or more of the machines or vehicles may be robotic devices guided by computer control systems.

Mobile robotic devices can be used in a number of different environments to accomplish a variety of tasks. For example, mobile robotic devices can deliver items, such as parts or completed products, within indoor environments, such as warehouses, hospitals and/or data centers. When mobile robotic devices are deployed, they can use one or more possible paths to and from delivery and/or other locations. These paths can be determined using one or more route planning algorithms.

SUMMARY

In one aspect, a method is provided. A computing device determines a roadmap representing an environment that includes a plurality of mobile robotic devices. The roadmap includes a plurality of intersections connected by a plurality of edges, where the plurality of intersections includes a first intersection associated with a first edge and a second edge of the plurality of edges, and where the first edge is between the first intersection and a second intersection. The computing device determines an edge interaction region surrounding the first intersection, where the edge interaction region includes a portion of the first edge and a portion of the second edge. A first traversal region of a robotic device traveling on the portion of the first edge within the edge interaction region overlaps a second traversal region of another robotic device traveling on the portion of the second edge within the edge interaction region. The computing device determines a first sub-edge and a second sub-edge of the first edge, where the first sub-edge is within the edge interaction region and the second sub-edge is outside the edge interaction region. The computing device receives a request to determine a route through the environment for a mobile robotic device of the plurality of mobile robotic devices. The computing device determines the route through the environment, where the route through the environment specifies travel along the first sub-edge with a first rule set and travel along the second sub-edge with a second rule set. The computing device provides the route to the mobile robotic device.

In another aspect, a system is provided. The system includes a plurality of mobile robotic devices and a computing device. The computing device includes one or more processors; and data storage including at least computer-executable instructions stored thereon that, when executed by the one or more processors, cause the computing device to perform functions. The functions include: determining a roadmap representing an environment that includes the plurality of mobile robotic devices, where the roadmap includes a plurality of intersections connected by a plurality of edges, where the plurality of intersections includes a first intersection associated with a first edge and a second edge of the plurality of edges, and where the first edge is between the first intersection and a second intersection; determining an edge interaction region surrounding the first intersection, where the edge interaction region includes a portion of the first edge and a portion of the second edge, and where a first traversal region of a robotic device traveling on the portion of the first edge within the edge interaction region overlaps a second traversal region of another robotic device traveling on the portion of the second edge within the edge interaction region; determining a first sub-edge and a second sub-edge of the first edge, where the first sub-edge is within the edge interaction region and the second sub-edge is outside the edge interaction region; receiving a request to determine a route through the environment for a mobile robotic device of the plurality of mobile robotic devices; determining the route through the environment, where the route through the environment specifies travel along the first sub-edge with a first rule set and travel along the second sub-edge with a second rule set; and providing the route to the mobile robotic device.

In another aspect, a non-transitory computer readable medium is provided. The non-transitory computer readable medium has stored thereon instructions, that when executed by one or more processors of a computing device, cause the computing device to perform functions. The functions include: determining a roadmap representing an environment that includes a plurality of mobile robotic devices, where the roadmap includes a plurality of intersections connected by a plurality of edges, where the plurality of intersections includes a first intersection associated with a first edge and a second edge of the plurality of edges, and where the first edge is between the first intersection and a second intersection; determining an edge interaction region surrounding the first intersection, where the edge interaction region includes a portion of the first edge and a portion of the second edge, and where a first traversal region of a robotic device traveling on the portion of the first edge within the edge interaction region overlaps a second traversal region of another robotic device traveling on the portion of the second edge within the edge interaction region; determining a first sub-edge and a second sub-edge of the first edge, where the first sub-edge is within the edge interaction region and the second sub-edge is outside the edge interaction region; receiving a request to determine a route through the environment for a mobile robotic device of the plurality of mobile robotic devices; determining the route through the environment, where the route through the environment specifies travel along the first sub-edge with a first rule set and travel along the second sub-edge with a second rule set; and providing the route to the mobile robotic device.

In another aspect, an apparatus is provided. The apparatus includes: means for determining a roadmap representing an environment that includes a plurality of mobile robotic devices, where the roadmap includes a plurality of intersections connected by a plurality of edges, where the plurality of intersections includes a first intersection associated with a first edge and a second edge of the plurality of edges, and where the first edge is between the first intersection and a second intersection; means for determining an edge interaction region surrounding the first intersection, where the edge interaction region includes a portion of the first edge and a portion of the second edge, and where a first traversal region of a robotic device traveling on the portion of the first edge within the edge interaction region overlaps a second traversal region of another robotic device traveling on the portion of the second edge within the edge interaction region; means for determining a first sub-edge and a second sub-edge of the first edge, where the first sub-edge is within the edge interaction region and the second sub-edge is outside the edge interaction region; means for receiving a request to determine a route through the environment for a mobile robotic device of the plurality of mobile robotic devices; means for determining the route through the environment, where the route through the environment specifies travel along the first sub-edge with a first rule set and travel along the second sub-edge with a second rule set; and means for providing the route to the mobile robotic device.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIG. 3A is a roadmap of the environment of FIG. 1 illustrated with edge interaction regions, in accordance with an example embodiment.

FIG. 3B is a roadmap of the environment of FIG. 1 updated to include additional intersections based on the edge interaction regions of FIG. 3A, in accordance with an example embodiment.

DETAILED DESCRIPTION

Overview

Figure 2:
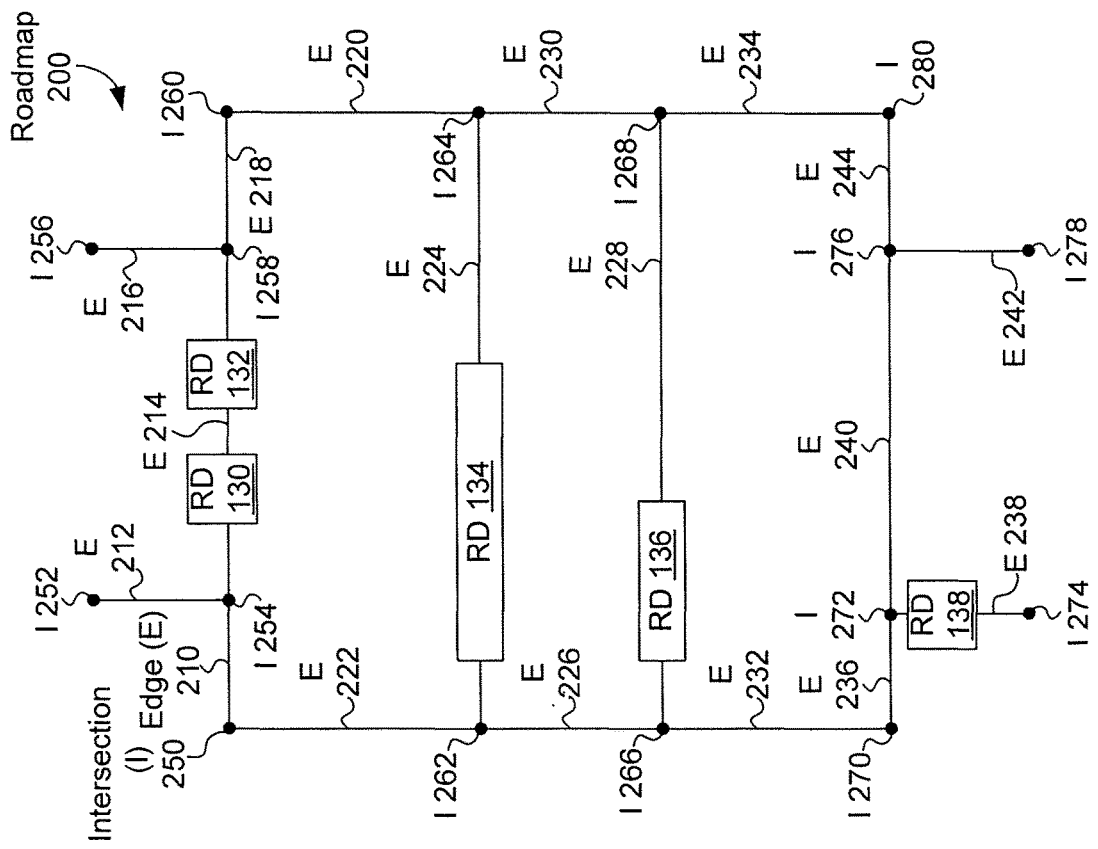
FIG. 2 is a roadmap of the environment of FIG. 1, in accordance with an example embodiment.

To accomplish tasks within an environment, a mobile robotic device can use a "roadmap", or set of routes within the environment, to travel in a safe and efficient fashion within the environment. The roadmap for autonomous vehicle navigation can have a discrete representation that can be used for multi-agent coordination; e.g., coordination between multiple robotic devices within the environment. Example agents include, but are not limited to, (mobile) robotic devices, human operators, vehicles, and/or other mobile objects within the environment. The roadmap can be represented as a graph with edges representing routes within the environment and nodes representing terminal locations of routes and intersections between routes.

The roadmap can be considered to have two types of regions: edge interaction regions (EIRs), or regions having or otherwise related to multiple edges; i.e., areas at or near intersections, and edge non-interaction regions (ENRs), or regions not having related to multiple edges. Example edge interaction regions can include areas at or near intersections and areas where two or more edges are close to each other but may not intersect; e.g., regions with close parallel lines.

Edge interaction regions can relate to traversal regions or regions where robotic devices can potentially come in contact with each other. A traversal region of a mobile robotic device can include an area covered by the mobile robotic device while traveling between two or more points. In some cases, the traversal region can include a planned traversal region, or an area that the mobile robotic device has been instructed to cover. For example, if a mobile robotic device Robot1 has been instructed to go from point A to point B and is currently at point C along the route, then the traversal region can include the area covered by Robot1 between points A and C. If the planned traversal region is included, then the traversal region can include the area that has been and will be covered by Robot1 traveling between points A and B.

The traversal region surrounding the route can be based on a footprint, or surface space covered by, a mobile robotic device. For example, the traversal region for Robot1 can involve sweeping out the volume traveled between points A and B by moving the footprint of Robot1 along the path Robot1 took between points A and B.

An initially (sparse) roadmap can be updated to include additional intersections based on the edge interaction regions. For example, an intersection can be added to an edge at a point where the edge interaction region intersects the edge. This added intersection can represent a location on the edge where a robotic device changes from being guided by multiple agent planning software to being guided by single agent planning software or vice versa.

Edge interaction regions of a roadmap can be associated with the use of multiple agent planning software and edge non-interaction regions of the roadmap can be associated with the use of single agent planning software. Generally speaking, single agent planning software allows the robotic device to set its own velocity while traveling along a path as long as the robotic device is likely not to collide with another object, while multiple agent planning software instructs to the robotic device to request and receive permission before entering an edge interaction region.

The single agent planning software and/or the multiple agent planning software can examine a state of an edge to determine whether or not a portion of an edge inside the edge interaction region is available, or free from other robotic devices, before granting permission to enter the edge interaction region.

In some embodiments, the state of the edge can be deactivating, which can be a transitional state between the states of edge availability and unavailability. In other embodiments, the robotic device determines its own maximum velocity and/or other kinematic parameter values while inside the edge interaction region. In still other embodiments, multiple agent planning software can instruct the robotic device about its maximum velocity and/or other kinematic parameter values at least once while inside the edge interaction region.

Multiple agent planning software can include a different rule set than is used by single agent planning software. For example, multiple agent planning software can include one set of instructions regarding sensing and reacting to other agents (e.g., mobile robotic devices, human operators), while single agent planning software can include a different set of instructions regarding sensing and reacting to other agents. The single agent planning software can have one or more rules allowing the use of single agent planning as long as a robotic device can use on board sensors to ensure a minimum distance is maintained to another object; e.g., another robotic device in front of the robotic device.

These rules in rule sets may rely upon the use of directed edge in a road map; e.g., an undirected edge running north and south in a roadmap can be replaced by a northbound directed edge and a southbound directed edge. Then, the single agent planning software can assume that all objects follow the directionality of an directed edge; e.g., if a robotic device is traveling along a northbound edge directed by single agent planning software, then the single agent planning software can assume other moving objects on the edge are moving north as well.

Many other examples of differing rule sets between multiple agent planning software and single agent planning software are possible as well.

The use of edge interaction regions and edge non-interaction regions provides a convenient and discrete representation with roadmaps that can be used for multi-agent coordination. In some embodiments, multiple agent planning software is more efficient and/or scales up better when fewer states of an agent are used. In these embodiments, the use of edge interaction regions and edge non-interaction regions can reduce the number of states related to agent interaction while traveling along a roadmap to two. These two states can include a first state where an agent is in an edge interaction region and a second state where an agent is in an edge non-interaction region (that is, the second state is equivalent to the agent not being in an edge interaction region).

Segmenting edges based on edge interaction regions and edge non-interaction regions can be used to minimize the number of segments in a roadmap where two agents could possibly find themselves in conflict, such as deadlocks at intersections. In some examples, the number and size of edge interaction regions can be minimized so to reduce delays for a robotic device traveling through the environment. For example, suppose a robotic device RDONLY were the only robotic device active in an environment that utilized single agent planning software on edge non-interaction regions and utilized multiple agent planning software in edge interaction regions. Even though RDONLY can traverse each edge interaction regions within the environment without stopping because there are no other nearby robots, RDONLY would still incur a delay at each edge interaction region. This delay would be due to waiting for permission from the multiple agent planning software to enter the edge interaction region. These delays can be exacerbated if the multiple agent planning software is not resident aboard RDONLY. Then, minimizing the number and area of edge interaction regions can minimize the number of times and the lengths of edges for which RDONLY has to utilize the multiple agent planning software.

The herein-described techniques and apparatus can further be based on an ability of mobile robotic devices to follow each other relatively cheaply and reliably. That is, mobile robotic devices can follow each other (or another vehicle) reliably using only onboard sensors. Then, planning for mobile robotic devices instructed to follow each other as a convoy can simplify route planning for even complex roadmaps and environment. That is, when planning for multiple robotic devices can be reduced to planning for one convoy of robotic devices, the number of states to be modeled may decompose into a very small number of states with a low branching factor. Thus, the use of roadmaps utilizing edge interaction regions can simplify and speed route planning for robotic devices routed based on these roadmaps.

Using Roadmaps to Coordinate Robotic Devices

Figure 1:
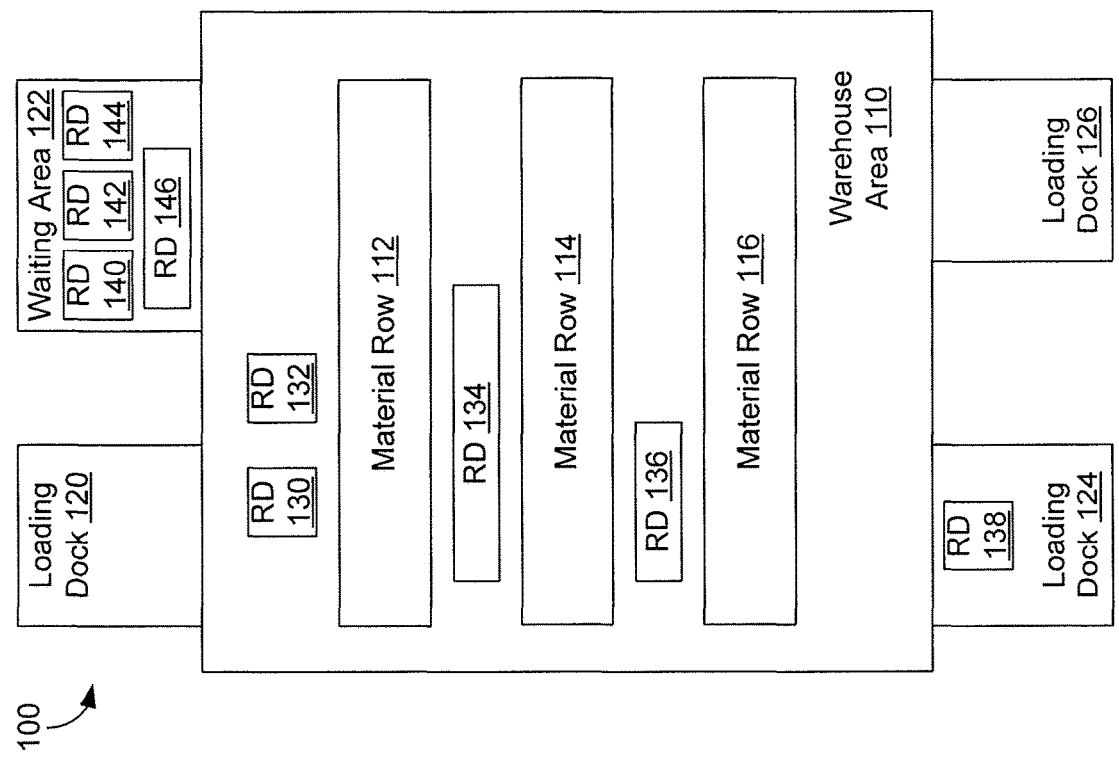
FIG. 1 shows an environment, in accordance with an example embodiment.

FIG. 1 shows example environment 100 that includes warehouse area 110, loading docks 120, 124, 126, and waiting area 122, with warehouse area 110 including material rows 112, 114, 116 and passageways between the material rows. Material can enter and exit warehouse area 110 via loading docks 120, 124, 126 and be stored in material rows 112, 114, 116 within warehouse area 110.

Mobile robotic devices 130, 132, 134, 136, 138, 140, 142, 144, 146 can operate in environment 100. These tasks can include conveying material within environment 100; e.g., conveying material to and from warehouse area 110 and loading docks 120, 124, 126, repairing robots within environment 100, and perhaps other tasks. When robotic devices are not performing tasks within environment 100, the robotic devices can be directed to waiting area 122.

FIG. 1 shows robotic devices 130, 132 performing a task involving material row 112, robotic device 134 performing a task involving material row 114, robotic device 136 performing a task involving material row 116, and robotic device 138 performing a task at loading dock 124. Additionally, robotic devices 140, 142, 144, 146 are in waiting area 122 awaiting task assignment or otherwise not currently deployed (e.g., under repair, being upgraded, charging, etc.). As shown in FIG. 1, robotic devices can have different sizes; e.g., robotic device 134 is larger than robotic device 136, which in turn is larger than robotic device 138. Also, robotic devices can have different load capacities, maximum and/or minimum velocities, stopping distances, and other characteristics. In other examples, all robotic devices within environment 100 can have the same model and manufacturer. However, even if all robotic devices in environment 100 are initially identical, the robotic devices may have different characteristics in operation, due to age, load, maintenance condition, and other factors.

FIG. 2 shows example roadmap 200 modeling environment 100. Roadmap 200 includes edges (Es) and intersections (Is). Roadmap 200 includes edges 210-244 and intersections 250-280. For example, edge 210 of roadmap 200 represents the passageway between the upper-right corner of environment 100 as depicted in FIG. 1 and an entrance of loading dock 120. Edge 210 connects intersections 250 and 254, where intersection 250 represents the upper-right corner of environment 100 and where intersection 254 represents the entrance to loading dock 120. As a second example, edge 212 of roadmap 200 represents a pathway along loading dock 120. Edge 212 connects intersections 250 and 252, where intersection 252 represents an outer edge of loading dock 120. As a third example, edge 238 of roadmap 200 represents a pathway along loading dock 124. Edge 238 connects intersections 272 and 274, where intersection 272 represents an entrance to loading dock 124 and intersection 274 represents an outer edge of loading dock 124. FIG. 2 also shows that robotic device 138 is represented in roadmap 200 as traveling along edge 238; that is, according to roadmap 200, robotic device 138 is at a location between the entrance and the outer edge of loading dock 124. Many other example environments and roadmaps are possible as well.

Robotic devices can be configured to perform tasks within environment 100 by traveling along predetermined routes, or combinations of edge(s) and intersection(s), specified using roadmap 200. Then, a robotic device can be instructed to follow one of the predetermined routes to carry out the task. For example, a robotic device can be configured to convey items from a central portion of material row 112 to loading dock 126 by traveling along a route R1, where route R1 can be represented by edge 214 to intersection 258, edge 218 between intersections 258 and 260, edge 220 between intersections 260 and 264, edge 230 between intersections 264 and 268, edge 234 between intersections 268 and 280, edge 244 between intersections 280 and 276, and edge 242 onto loading dock 126, perhaps reaching intersection 278 at an outer edge of loading dock 126. To carry out the example task, the robotic device can obtain the items from material row 112 and take route R1 to travel to loading dock 126 while using data provided by on-board sensors, such as cameras, radar, proximity sensors, and perhaps other sensors, to avoid collisions along the route.

To coordinate interactions between robotic devices operating in environment 100, agent coordination software, executing on processor(s) of a robotic device and/or of one or more agent planning servers, can plan routes of roadmap 200 to meet one or more criteria. These criteria can include, but are not limited to, maximizing a number of tasks performed, minimizing congestion between robotic devices, optimizing the number of robotic devices used within environment 100, and/or satisfying other conditions.

In some embodiments, the agent coordination software can include single agent planning software, which models conditions that involve interactions with only one robotic device, and multiple agent planning software, which models conditions that involve interactions with multiple robotic devices. To determine whether a robotic device is proximate to another robotic device and so may have an interaction with another robotic device, a comparison of distance between robotic devices to a threshold distance (e.g., 5 meters, 10 feet, 3*the maximum stopping distance of a robotic device). If the distance between robotic devices is within the threshold distance, the two robotic devices can be considered to be proximate. Other techniques for determining proximity are possible as well. In particular of these embodiments, the multiple agent planning software can be more resource intensive than the single agent planning software; then, in these particular embodiments, routes can be planned to meet one or more criteria related to minimizing utilization of the multiple agent planning software.

The agent coordination software can model environment 100 using a roadmap. For example, roadmap 200 depicted in FIG. 2 includes a location of robotic device 130 on edge 214, a location of robotic device 130 on edge 214 to the right of the location of robotic device 130, a location of robotic device 134 on edge 224, a location of robotic device 136 on edge 228, and a location of robotic device 138 on edge 238. Other information, such as velocities of robotic devices, locations and/or velocities of other entities (e.g., humans in mixed robotic/human environments), obstacles, charging/fueling stations, repair regions, etc. can be included in a state.

Minimizing the number of nodes and edges used by a roadmap to model an environment, such as roadmap 200 representing environment 100, can speed execution and/or reduce complexity of the agent coordination software; i.e., reduce utilization of multiple agent planning software. However, the use of too few edges and intersections in a roadmap can lead to inefficiencies. For example, if edges are reserved for use by one robotic device to avoid collisions and/or to minimize use of multiple agent software, then relatively-long edges can be underutilized—one robotic device can reserve and occupy a relatively-long edge for a relatively-long time while other robotic devices have to wait until they can reserve and then use the relatively-long edge. However, if relatively-long edges are divided into smaller edges, then agent planning complexity can increase due to having to consider, traverse, reservation of more edges and intersection to complete a route.

The use of edge interaction regions can provide a balance between sparseness and complexity of roadmaps that enhances efficiency without adding excess complexity. An algorithm for generating a relatively sparse set of edge interaction regions can involve determining a traversal region for a robotic device along a path through a roadmap. For example, the algorithm can slide a footprint of a robotic device RDA along the path to determine the traversal region of RDA along the path.

Then, the path can be segmented to include an edge interaction region when a set of currently active collisions for RDA changes. For example, as the algorithm slides the footprint of RDA along a path A from points P1 to P2, the algorithm can determine that the initial set of currently active collisions between the robotic device and the environment is the consecutively traversed portions of path A; e.g., the traversal region of RDA starting at P1 and traveling along path A. As the algorithm approaches follows along path A, the algorithm can determine that the traversal region of RDA intersects a traversal region involving a path B through an intersection I(A). The intersection of traversal regions involves a change in the set of currently active collisions for the traversal region along path A to include a collision with the traversal region along path B. After determining that the set of currently active collisions changed, the algorithm can record a collision point C1 where paths A and B initially collided.

As the algorithm continues along path A, the traversal region of RDA may no longer intersect path B, and so the set of currently active collisions can change again to remove the collision with path B. After determining that the set of currently active collisions changed, the algorithm can record a collision point C2 where paths A and B stopped colliding. Then, the path A can be segmented into a first portion starting at point P1 and ending at collision point C1, a second portion starting at point C1 and ending at collision point C2, and a third portion starting at collision point C2 for at least part of the remainder of path A going to point P2. In this example, an edge interaction region associated with intersection I(A) can be determined based on the second portion of path A between collision points C1 and C2.

FIG. 3A shows roadmap 200 illustrated with example edge interaction regions 310, 312, 314, 316, 318, 320, 322, 324, 326, 328, 330, and 332. An edge interaction region can surround or otherwise include an intersection of a roadmap; for example, edge interaction region 328 at lower-left of FIG. 3A is shown as a gray circular region surrounding intersection 272 that includes portions of edges 236, 238, and 240. Each edge interaction region indicates a region where edges can interact, e.g., edges can approach each other and/or intersect. As indicated in FIG. 3A, edge interaction regions can be specified based on intersections of a road map; however in other examples, edge interaction regions can be specified for locations not involving intersections, such as locations where edges are proximate to each other but do not intersect.

As the edges can interact, then robotic devices within an edge interaction region may come into contact with each other. The size and/or shape of edge interaction region can be determined to indicate a region of possible robotic device contact, such as a region where a volume of a robotic device RD3 moving along one edge E3 associated with the edge interaction region could be expected to overlap a volume of a robotic device RD4 moving along another edge E4 associated with the edge interaction region. That is, if RD3 moves along a portion of E3 within the edge interaction region and RD4 moves along a portion of E4 within the edge interaction region at the same time, then the probability that RD3 comes in contact with RD4 within the edge interaction region is greater than a predetermined threshold probability value; e.g., 0.001, 0.05, 0.25, 0.5. The edge interaction regions shown in the Figures are based on circular regions; in other examples, edge interaction regions can take different shapes; e.g., elliptical, polygonal, and/or other shapes that indicate regions related to multiple edges.

FIG. 3B shows roadmap 300 which is roadmap 200 that has been updated to include additional intersections based on the edge interaction regions shown in FIG. 3A. In particular, each edge of roadmap 300 has been updated to include an intersection located at points where one or more edge interaction regions intersect the edge. To continue the example discussed above in the context of FIG. 3A, edges 236, 238, and 240 have been updated to include respective intersections 328a, 328b, and 328c indicating the respective points of intersection between the respective edges and edge interaction region 328.

In some embodiments, some intersections added based on edge interaction regions can be merged and/or removed, perhaps by a post-processing step, if the added intersections are proximate to each other; e.g., intersection 326b added to edge 236 based on edge interaction region 326 can be considered to be proximate to intersection 328a added to edge 236 based on edge interaction region 328, and so intersections 326b and 328a can be merged or removed. Merging and/or removal of intersections can indicate that edge interaction regions are sufficiently proximate as to overlap. In this example, merging of intersections 326 and 328a can effectively indicate that edge 236 is within an edge interaction region.

To coordinate interactions between robotic devices operating in environment 100, agent coordination software, executing on processor(s) of a robotic device and/or of one or more agent planning servers, can plan routes of roadmap 200 to meet one or more criteria. These criteria can include, but are not limited to, maximizing a number of tasks performed, minimizing congestion between robotic devices, optimizing the number of robotic devices used within environment 100, and/or satisfying other conditions.

In some embodiments, the agent coordination software can include single agent planning software, which guides robotic devices in conditions that involve interactions with only one robotic device, and multiple agent planning software, which guides robotic devices in conditions that involve interactions between multiple robotic devices. In some embodiments, the multiple agent planning software can be more resource intensive than the single agent planning software; then, in these particular embodiments, routes can be planned to meet one or more criteria related to minimizing utilization of the multiple agent planning software. Then, to minimize resource utilization for robotic route planning, the use of single agent planning software can be prioritized over the use of multiple agent planning software. For example, single agent planning software can be prioritized to be generally used for robotic route planning.

In particular embodiments, single agent planning software can be used when a robotic device is not likely to be proximate to another robotic device and multiple agent planning software can be used when a robotic device is likely to be proximate to another agent. Then, in combination with embodiments that determine likelihoods of robotic proximity at least in part based on edge interaction regions, single agent planning software can be used when a robotic device is not in an edge interaction region (that is, in an edge non-interaction region), and multiple agent planning software can be used when a robotic device is in an edge-interaction region.

Robotic devices can be configured to perform tasks within environment 100 by traveling along predetermined routes, or combinations of edge(s) and intersection(s), specified using roadmap 200. Then, a robotic device can be instructed to follow one of the predetermined routes to carry out the task under the control of agent planning software; e.g., single agent planning software and/or multiple agent planning software.

Figure 3C:
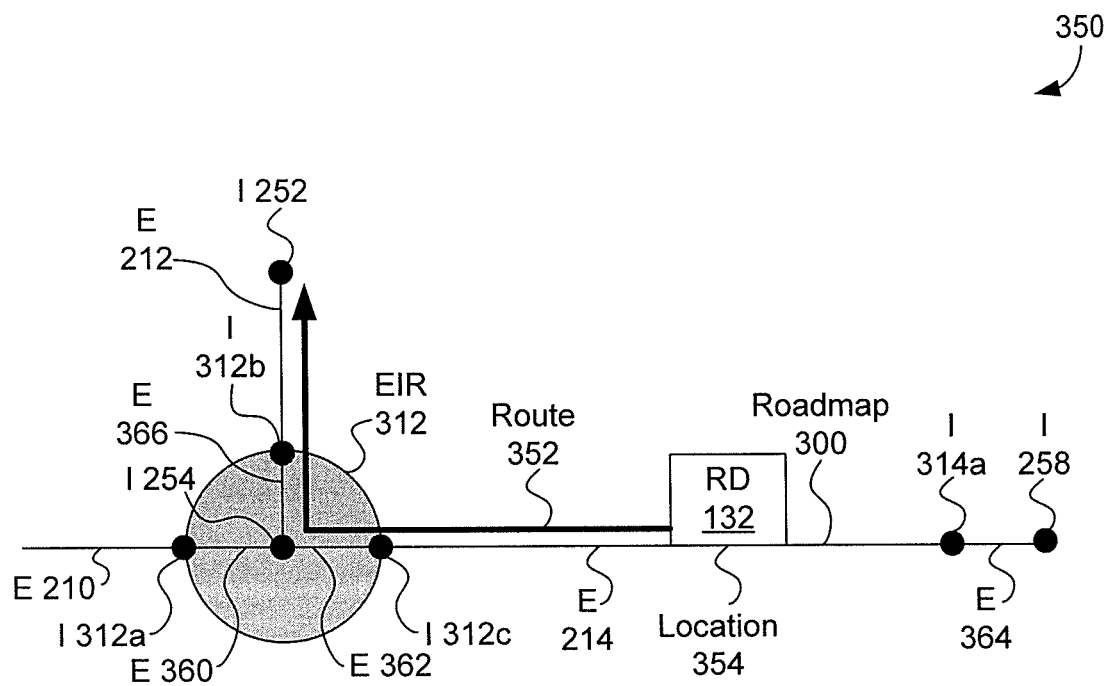
FIG. 3C shows a scenario 350 where a robotic device is directed to travel on a route to carry out a task, in accordance with an example embodiment.

FIG. 3C shows a scenario 350 where robotic device 132 is directed to travel on route 352 to carry out a task, in accordance with an example embodiment. In scenario 350, robotic device 132 is directed to carry out a task to take material from material row 112 of environment 100 to loading dock 120. Upon reaching loading dock 120, the task is completed by robotic device 132 while at the loading dock.

To accomplish this task, robotic device 132 is first directed to obtain the material from material row 112 and then take a predetermined route, shown in FIG. 3C as route 352, to loading dock 120. The direction to carry out the task using route 352 can be provided to robotic device 132 by a routing computing device, such as a computing device executing route planning software, single agent planning software, and/or multiple agent planning software. In some embodiments, the direction to carry out the task using route 352 can include a representation of route 352. In other embodiments, upon receiving the direction to carry out the task, robotic device 132 can send a request to the routing computing device for a route to carry out the task. Then, the routing computing device can respond to the request with a representation of the requested route; in this example, a representation of route 352. The representation of the route can include a listing of edges and/or intersections to be taken on the route, one or more references to a pre-determined route (e.g., take pre-determined route #44 that corresponds to route 352 of FIG. 3C), and/or another representation of the route.

As indicated by roadmaps 200 and 300, edge 214 can be used by robotic device 132 to travel along material row 112. Then, upon reaching intersection 254, robotic device can take edge 212 to reach intersection 252, which represents the end of loading dock 120. Therefore, route 352 involves robotic device 132 traveling along edge 214 to intersection 254, traveling through intersection 254 onto edge 212, and then traveling along edge 212 to intersection 252.

As indicated by roadmap 300 and in FIG. 3C, edges 212 and 214 have been segmented into two or more sub-edges based on intersections added to represent edge interaction regions. In particular, FIG. 3C shows that edge 212 has been segmented into a first sub-edge labeled edge 212 from intersection 252 to intersection 312b, and a second sub-edge labeled edge 366 from intersection 312b to intersection 254, and shows that edge 214 has been segmented into a first sub-edge labeled edge 362 from intersection 254 to intersection 312c, a second sub-edge labeled edge 214 from intersection 312c to intersection 314a, and a third sub-edge labeled edge 364 from intersection 314a to intersection 258. The sub-edge of edge 212 labeled with the original edge number 212 corresponds to a portion of edge 212 in an edge non-interaction region, and the other sub-edge of edge 212; that is, sub-edge 366, corresponds to a portion of edge 212 in edge interaction region 312. Similarly, the sub-edge of edge 214 labeled with the original edge number 214 corresponds to a portion of edge 214 in an edge non-interaction region, while sub-edge 362 corresponds to a portion of edge 214 in edge interaction region 312, and sub-edge 364 corresponds to a portion of edge 214 in edge interaction region 314 (edge interaction region 314 shown in FIG. 3A but not in FIG. 3C).

Note that intersection 252 is not shown as being associated with an edge interaction region in either FIG. 3A or 3C as intersection 252 models the (dead) end of loading dock 120. In other examples, intersection 252 and/or other dead-end intersections associated with dead ends as shown in FIG. 3A can be associated with respective edge interaction regions.

In scenario 350, robotic devices are guided through edge interaction regions using multiple agent planning software and are guided through edge non-interaction regions using single agent planning software. During scenario 350, no agents interact with robotic device 132 while in edge non-interaction regions.

Scenario 350 begins with robotic device 132 being instructed to obtain material located in material row 112 at a location corresponding to location 354 along edge 214. Then, after obtaining the material from material row 112, robotic device 132 is instructed to take route 352 to convey the material to a location on loading dock represented by intersection 252. As such, for robotic device 132 travels along portions of environment 100 corresponding to edges labeled as 214, 362, 366, and 212 in FIG. 3C that make up route 352 to complete its task.

Scenario 350 continues with single agent planning software guiding robotic device 132 while traveling from location 314 to intersection 312c on edge 214. Upon reaching intersection 312 corresponding to the boundary of edge interaction region 312, multiple agent planning software guides robotic device 132 along edges 362 and 366 through edge interaction region 312. Then, when robotic device 132 reaches intersection 312b, single agent planning software starts guiding robotic device 132 and continues to guide robotic device 132 until reaching intersection 252. Once robotic device 132 reaches intersection 252, scenario 350 can be completed.

To minimize planning tasks, robotic devices can be grouped into "convoys" or groups of robotic devices. Robotic devices can be instructed to form convoys by instructing robotic devices to follow a lead robotic device (i.e., the first robotic device in a direction of travel for the convoy) and each other, where the robotic devices can rely upon on-board sensing capabilities to safely follow another robotic device and avoid collisions. By grouping robotic devices into convoys, a number of robotic devices traveling in the same direction that could require use of multiple agent planning software can all be guided using single agent planning software instead. For example, a convoy of two or more robotic devices can be guided through edge non-interaction regions using single agent planning software for each robotic device in the convoy.

A model of a convoy of robotic devices following along an edge can be generated by representing the starting, central, and/or ending locations of convoy and, if necessary, the velocity of the leading robotic device in the convoy—the other robotic devices are instructed to follow, and so will either follow at the same velocity as the leading robotic device or will fall behind. If the one or more robotic devices follow a leading robotic device at the same velocity (e.g., to form a convoy), the following robotic device(s) can be each instructed to follow a preceding robotic device while keeping at least a minimum following distance between the following robotic device (i.e., itself) and the preceding robotic device. The minimum following distance can be determined based on data received by sensors aboard the following robotic device; e.g., proximity sensors, location sensors, cameras.

If one or more robotic devices fall behind, these trailing robotic devices can then be modeled as another, slower convoy moving along the same edge. Further, one or more other robotic devices can be added to a convoy as the device(s) reach a trailing robotic device of the convoy. When the convoy reaches an intersection, some robotic devices in the convoy can branch off by taking different routes through the intersection.

Figure 4A:
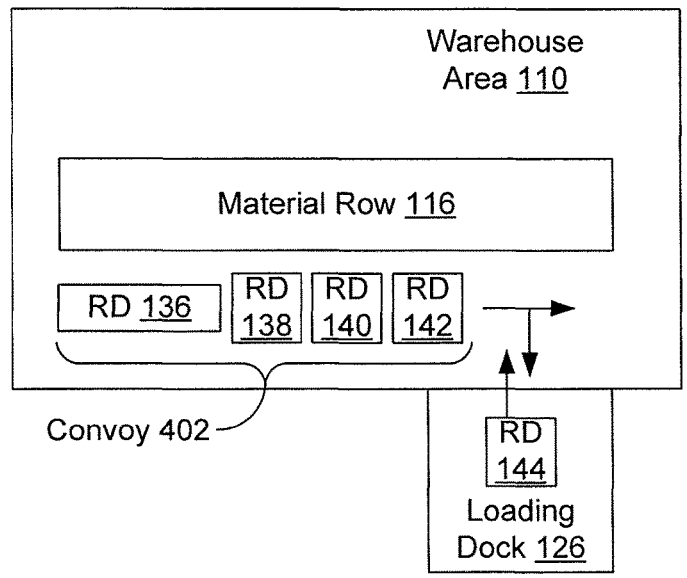
FIG. 4A shows a scenario involving a convoy of robotic devices operating in the environment of FIG. 1, in accordance with an example embodiment.

FIG. 4A shows scenario 400 where convoy 402, formed by robotic devices 136, 138, 140, 142, is traveling along a passageway below material row 116 of warehouse area 110. As convoy 402 moves in a direction of travel toward an intersection with an entrance of loading dock 126, robotic device 142 is the lead robotic device of convoy 402. FIG. 4A shows that robotic device 144 is operating on loading dock 126. FIG. 4A uses arrows to indicate that robotic devices 136, 138, 140, 142 in convoy 402 can either go through the intersection to continue along the passageway below material row 116 or go right onto loading dock 126 and that robotic device 144 can go up from loading dock 126 to the passageway below material row 116.

In some examples, each edge of a roadmap can have an "edge state" indicating a status of the edge. In particular, the edge state can be one of: an available state, an unavailable state, and a deactivating state. The available edge state indicates that the edge is accessible for current use by a robotic device. The unavailable edge state indicates that the edge is inaccessible for current use by a robotic device and so the robotic device would have to wait for the edge to have an available edge state. The deactivating edge state indicates that the edge is currently being used by one or more robotic devices and that no additional robotic devices can enter the edge. In some embodiments, an edge having a deactivating edge state that is currently occupied by one or more robotic devices in a convoy will only allow additional robotic devices in the convoy to enter the edge; that is, once an edge is marked with a deactivating edge state, robotic devices in a convoy can occupy the edge. After the convoy has completed using the deactivated edge, the edge state can change from deactivated to unavailable.

The single agent planning software and/or the multiple agent planning software can include rules for directing mobile robotic device based on the state of the edge. For example, the rule set for the multiple agent planning software for a mobile robotic device MRD can include one or more rules for MRD to: (a) stop before reaching a portion P1 of the environment corresponding to edge E1 if the state of edge E1 is the unavailable state and (b) proceed to portion P1 if the state of edge E1 is the available state. As another example, mobile robotic device MRD can be part of a convoy of robotic devices. Then, the rule set for the single agent planning software for MRD include one or more rules for MRD to: (a) stop before reaching a portion P2 of the environment corresponding to an edge E2 if the state of edge E2 is the deactivating state and if robotic devices in the convoy are absent from P2 and (b) proceed to portion P2 if the state of edge E2 is the deactivating state and if one or more robotic devices in the convoy are present in P2. Many other rules are possible for the single agent planning software and/or the multiple agent planning software.

Edge states can be used by multiple agent planning software to coordinate access to edge interaction regions. Assume that at most one edge associated with an edge interaction region is activated at one time. Then, the multiple agent planning software can deny permission to enter an edge interaction region to robotic devices arriving on deactivated edges and grant permission to enter an edge interaction region to robotic devices arriving on activated edges. Once one or more robotic devices on an activated or partially-deactivated edge exit the edge interaction region, the activated or partially-deactivated edge is changed to the deactivated state, another edge associated with the edge interaction region can be activated, and robotic devices on the now-activated edge can be granted entry into the edge interaction region.

For example, suppose at time T1 robotic device RD1 reaches an edge interaction region EIR1 via an edge E1 and robotic device RD2 reaches EIR1 via a different edge E2. Then, both RD1 and RD2 can use multiple agent planning software at the same time to request permission to enter EIR1. The multiple agent planning software can determine the edge states of edges E1 and E2 to determine which robotic device can enter EIR1. If either edge E1 or E2 was in the activated state, and grant permission to enter EIR1 to the robotic device on that edge; e.g., grant permission to RD1 if edge E1 was in the activated state and deny permission to RD2 on deactivated edge E2 (or vice versa). In case that neither E1 nor E2 was activated, then the multiple agent planning software can change the state of either edge E1 or E2 to activated and grant permission to enter EIR1 to the robotic device on that edge; e.g., change the edge state of edge E2 to activated and grant permission to RD2 and deny permission to RD1 on deactivated edge E1 (or vice versa).

In the context of roadmaps 200 and 300, a direction of travel of convoy 402 in scenario 400 is moving right along edge 240 toward intersection 276. When robotic devices 136, 138, 140, 142 of convoy 402 approach intersection 276, each robotic device can decide to either turn right onto loading dock 126 (or turn onto edge 242 of roadmap 200 or 300) or to go straight along the passageway below material row 116 (or move onto edge 244 of roadmap 200 or 300). In scenario 400, as convoy 402 travels along edge 240 toward intersection 276, each robotic device in convoy 402 can examine the edge the robotic device will take out of intersection 276; e.g., either edge 242 or 244. If the edge is in the available edge state or in the deactivating edge state and one or more robotic device(s) in convoy 402 are occupying the edge, the robotic device can proceed to the edge the robotic device will take out of intersection 276. Otherwise; i.e., the edge is either in the unavailable edge state or the edge is in the deactivating edge state and no robotic device(s) in convoy 402 are occupying the edge, the robotic device can wait for the edge to become available; e.g., have an available edge state. In some embodiments, each robotic device (of a convoy) can examine the edge state of the edge the robotic device will take out of an intersection before actually reaching the intersection, perhaps to avoid congestion at the intersection.

In scenario 400, two types of robotic devices are represented in convoy 402—a relatively small type T1 of robotic device shown as robotic devices 138, 140, 142, and a relatively large type T2 of robotic device shown as robotic device 136. Also, each type of robotic device has a different stopping distance—type T1 robots have a shorter stopping distance than type T2 robots.

Figure 4B:
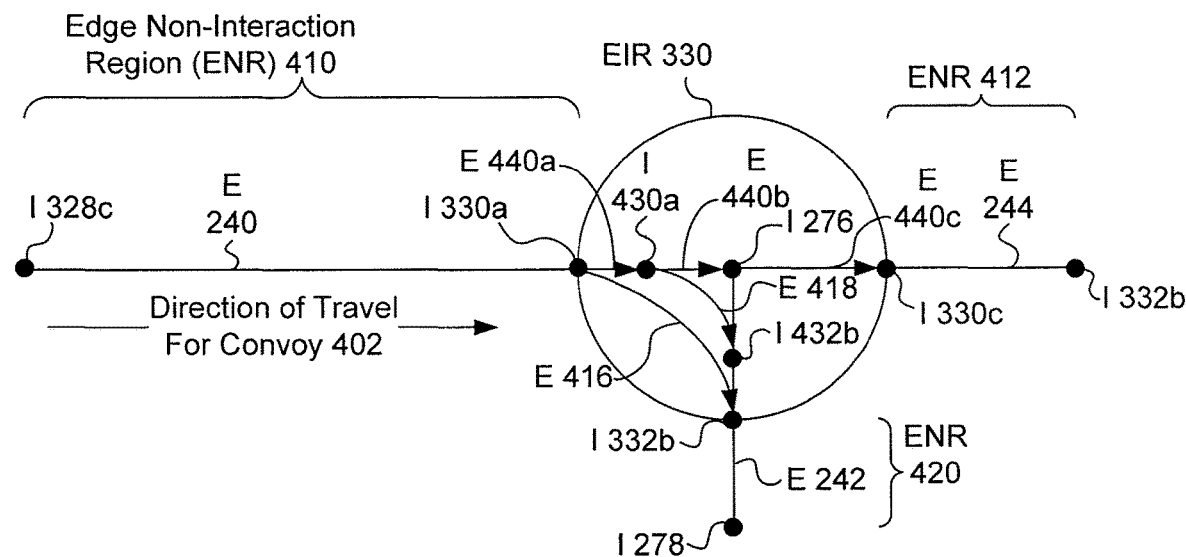
FIG. 4B is a roadmap for a portion of the environment of FIG. 1 illustrated in FIG. 4A, in accordance with an example embodiment.

FIG. 4B shows an example portion of roadmap 300 that models a portion of environment 100 including the intersection of to the passageway below material row 116 with the entrance of loading dock 126 shown in FIG. 4A. The portion of roadmap 300 shown in FIG. 4A includes edge non-interaction region 410 of edge 240 between intersections 328c and 330a, and edge interaction region 330 surrounding intersection 276 that includes a portion of edge 240 between intersections 330a and 276. Edge interaction region 330, which is depicted as circular region centered at intersection 276, also includes a portion of edge 242 between intersections 276 and 332b and a portion of edge 244 between intersections 276 and 330c.

FIG. 4B shows that edge 240 includes a sub-edge in edge non-interaction region 410 between intersections 328c and 330a, a sub-edge 440a within edge interaction region 330 between intersections 330a and 430a, and a sub-edge 440b within edge interaction region 330 between intersections 430a and 276. FIG. 4B shows three sub-edges of edge 242: a sub-edge within edge interaction region 330 between intersections 276 and 432b, a sub-edge within edge interaction region 330 between intersections 432b and 332b, and a sub-edge within edge non-interaction region 430 between intersections 332b and 278. FIG. 4B further shows two sub-edges of edge 244—one sub-edge 440c within edge interaction region 330 between intersections 276 and 330c and another sub-edge in edge non-interaction region 412 between intersections 330c and 332b.

In some embodiments, robotic devices traveling along sub-edges in edge non-interaction regions follow different rules than robotic devices traveling along sub-edges in edge interaction regions. For example, robotic devices traveling in edge non-interaction regions can be planned using single agent planning software applying a first rule set including rules that generally do not plan for interactions with other robotic devices. However, robotic devices traveling in edge interaction regions can be planned using multiple agent planning software applying a second rule set including rules that plan for interactions with other robotic devices In the context of roadmap 300, convoy 402 of scenario 400 is moving right along edge 240 toward intersection 276. FIG. 4B shows intersections 330a and 340a preceding intersection 276 in the direction of travel of convoy 402. Type T1 (or type T2) robots can examine the edge state of the edge the robotic device will take out of intersection 276 no later than intersection 430a (or intersection 330a). If the robotic device can proceed to the edge the robotic device will take out of intersection 276, then the robotic device can travel from intersection 430a (or intersection 330a) through intersection 276 onto edge 244 via sub-edges 440a, 440b, and 440c. If edge 242 is the edge the robotic device will take out of intersection 276, the type T1 (or type T2) robotic device can travel along edge 418 (or edge 416) onto edge 242. If a type T1 (or type T2) robotic device cannot proceed to another edge from edge 240, then the type T1 (or type T2) robot can begin to stop no later than at intersection 430a (or intersection 330a), thereby stopping before reaching intersection 276 and so avoid blocking intersection 276. However, if a robotic device RD_STOP1 in convoy 402 stops before reaching intersection 276, then the robotic devices in convoy 402 that are following RD_STOP1 will stop as well (most likely at a location on edge 240) in accordance with the following robotic devices' instructions to follow a leading robotic device, such as RD_STOP1.

Figure 5:
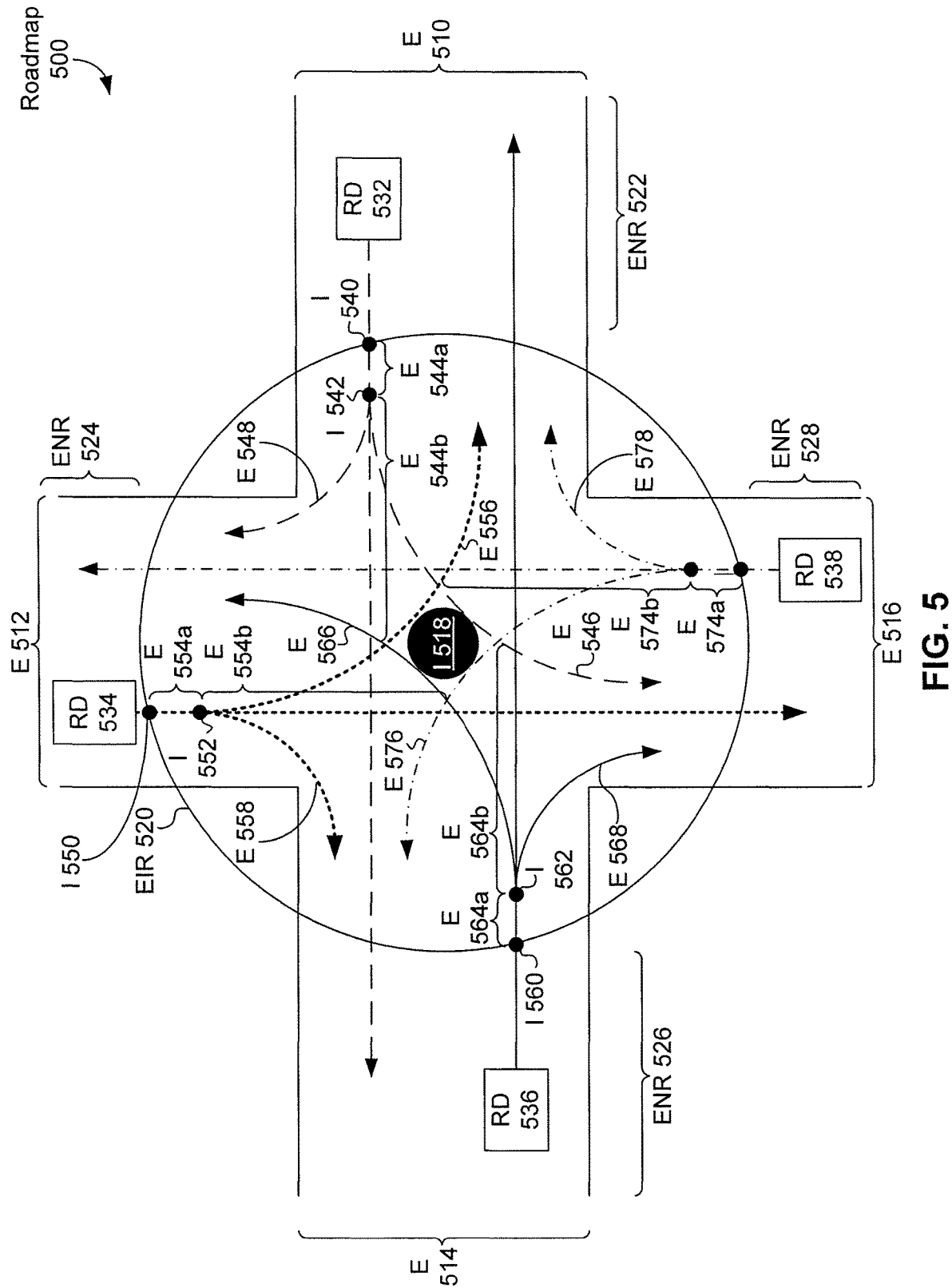
FIG. 5 depicts another roadmap for mobile robotic devices, in accordance with an example embodiment.

FIG. 5 depicts roadmap 500 for at least mobile robotic devices 532, 534, 536, 538, in accordance with an example embodiment. Roadmap 500 includes intersection 518 between edges 510, 512, 514, and 516. In the example shown in FIG. 5, robotic device 532 is traveling on edge 510, robotic device 534 is traveling on edge 512, robotic device 536 is traveling on edge 514, and robotic device 538 is traveling on edge 516.

Roadmap 500 shows edge interaction region 520 surrounding intersection 518. Roadmap 500 has been updated to add additional intersections 540, 542, 550, 552, 560, 562, 570, and 572 based on edge intersections with edge interaction region 520. In particular, respective edges 510, 512, 514, and 516 of roadmap 500 have been updated to include respective intersections 540, 550, 560, and 570 located at points where edge interaction region 518 intersects the respective edge. Roadmap 500 also indicates edge non-interaction regions 522, 524, 526, 528 for respective edges 510, 512, 514, and 516. Additionally, respective edges 510, 512, 514, and 516 of roadmap 500 have been updated to include respective intersections 542, 552, 562, and 572 located at points where one or more robotic devices, such as one of robotic devices 532, 534, 536, 538 or a convoy of robotic devices, would have to begin stopping to avoid blocking intersection 518.

Edges 510, 512, 514, and 516 of roadmap 500 have been partially divided into sub-edges based on the additional intersections. FIG. 5 shows that edge 510 includes sub-edge 544a between intersections 540 and 542, and sub-edge 544b between intersections 542 and 518; edge 512 includes sub-edge 554a between intersections 550 and 552, and sub-edge 554b between intersections 552 and 518; edge 514 includes sub-edge 564a between intersections 560 and 562, and sub-edge 564b between intersections 562 and 518; and edge 516 includes sub-edge 574a between intersections 570 and 572, and sub-edge 574b between intersections 572 and 518.

Roadmap 500 also includes directional or directed edges, shown with arrows in FIG. 5, indicating pathways robotic devices can use to traverse edge interaction region 520. A directional (or directed) edge can be an edge associated with a specified direction. For example, a directional (or directed) edge A1A2 from point A1 to point A2 can be associated with a direction specified from A1 to A2. Then, the directional edge A1A2 can be used to go from A1 to A2 but cannot be used to go in the opposite direction from A2 to A1. In contrast, an unidirectional or undirected edge, such as the edges shown in FIG. 3A, are not associated with a direction; that is, an un-directional edge UE1 from A1 to A2 can be used to go from A1 to A2 or from A2 to A1.

The directional edges can be part of a route provided to a robotic device to complete a task that involves traversing intersection 518. The route can be provided to the robotic device by a routing computing device, such as discussed above in the context of FIG. 3C. For example, routes through roadmap 500 can involve bidirectional lanes of travel by having two edges with opposite directions of travel sharing the same start and endpoints. Also, in some embodiments, different edge interaction regions may be used based on different directions of travel. For example, edge interaction regions can differ based on differences in traversal regions of robotic devices taking a first direction of travel in comparison to traversal regions of robotic devices taking a second direction of travel.

A robotic device traveling through edge interaction region 520 can cover a traversal region that is determined based on a route taken through the edge interaction region 520. As FIG. 5 indicates, many routes and corresponding traversal regions of robotic devices 532-538 through edge interaction area 520 overlap. For example, a traversal region for robotic device 538 taking a left turn from edge 518 to edge 514 taking a pathway indicated by edge 576 can be a region that includes at least the area covered by the footprint of robotic device 538 while taking edge 576, where edge 576 travels through sub-edge 574b of edge 516 and sub-edges 564a and 564b of edge 514. Also, the traversal region for robotic device 536 taking a left turn from edge 514 to edge 512 taking a pathway indicated by edge 566 can be a region that includes at least the area covered by robotic device 536 while taking edge 566, where edge 566 travels through sub-edge 564b of edge 516 and sub-edges 554a and 554b of edge 512. Then, in this example, the traversal region of robotic device 538 overlaps the traversal region of robotic device 536.

Robotic device 532 approaching intersection 518 on edge 510 can either: (a) travel straight through intersection 518 by traveling on sub-edges 544a and 544b until reaching edge 514, (b) take a left turn using edge 546 to reach edge 516, or (c) take a right turn using edge 548 to reach edge 516. FIG. 5 uses relatively-long dashes to show directional edges that robotic device 532 can use to traverse edge interaction region 520.

Robotic device 534 approaching intersection 518 on edge 512 can either: (a) travel straight through intersection 518 by traveling on sub-edges 554a and 554b until reaching edge 516, (b) take a left turn using edge 556 to reach edge 510, or (c) take a right turn using edge 558 to reach edge 514. FIG. 5 uses relatively-short dashes to show the directional edges that robotic device 534 can use to traverse edge interaction region 520.

Robotic device 536 approaching intersection 518 on edge 514 can either: (a) travel straight through intersection 518 by traveling on sub-edges 564a and 564b until reaching edge 510, (b) take a left turn using edge 566 to reach edge 512, or (c) take a right turn using edge 568 to reach edge 516. FIG. 5 uses solid lines to show the directional edges that robotic device 536 can use to traverse edge interaction region 520.

Robotic device 538 approaching intersection 518 on edge 516 can either: (a) travel straight through intersection 518 by traveling on sub-edges 574a and 574b until reaching edge 512, (b) take a left turn using edge 576 to reach edge 514, or (c) take a right turn using edge 578 to reach edge 510. FIG. 5 uses dotted-and-dashed lines to show the directional edges that robotic device 538 can use to traverse edge interaction region 520.

Figure 6A:
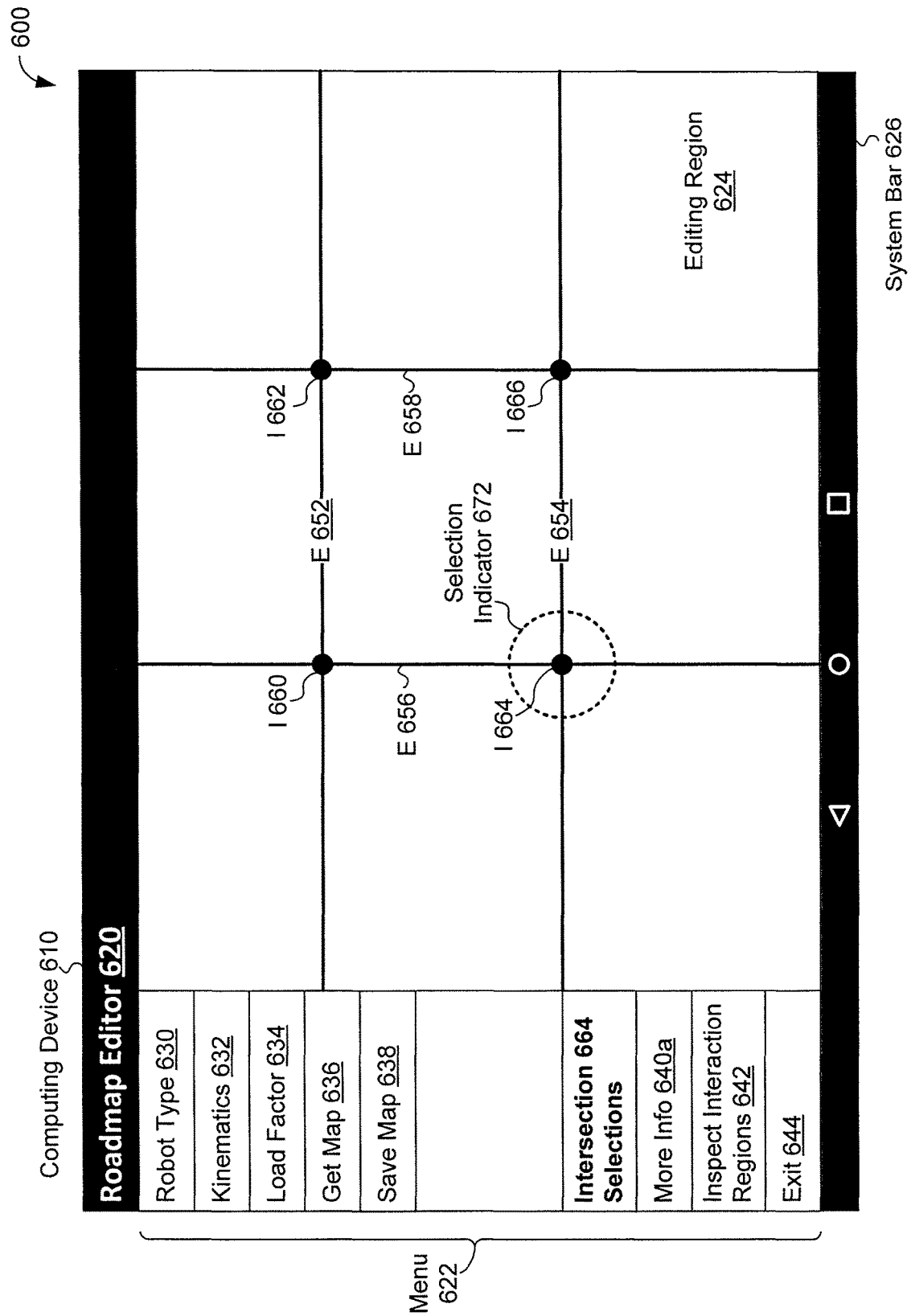
FIGS. 6A and 6B depict a scenario where a user interface of a computing device is used to interact with roadmaps, in accordance with an example embodiment.
Figure 6B:
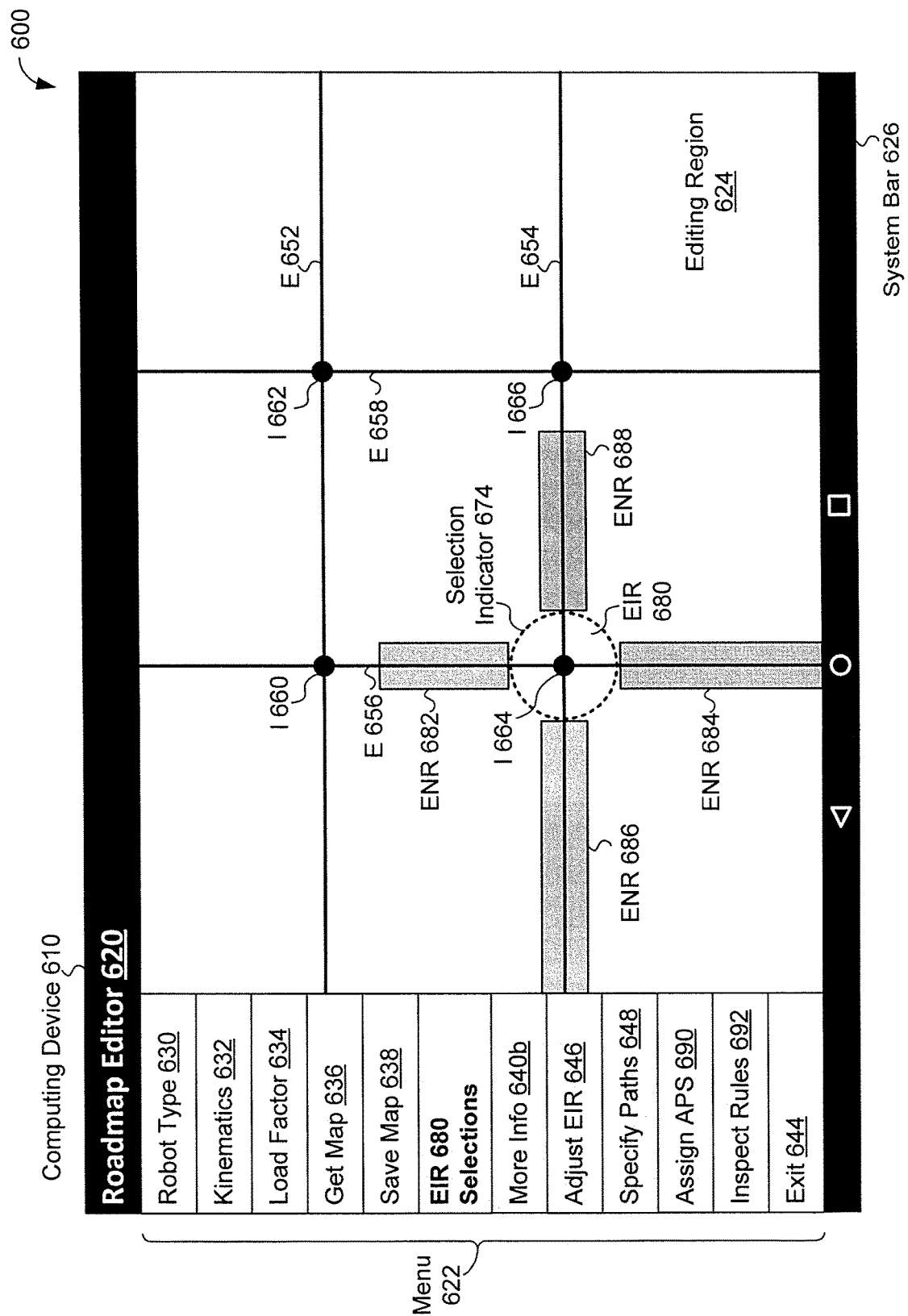

FIGS. 6A and 6B depict scenario 600 where a user interface of computing device 610 is used to interact with roadmaps, in accordance with an example embodiment. During scenario 600, the user interface is used to select an intersection of a previously-loaded roadmap and then review edge interaction regions and edge non-interaction regions associated with the selected intersection.

FIG. 6A illustrates the user interface provided by computing device 610 as roadmap editor 620. Roadmap editor 620 includes menu 622, editing region 624, and action bar 626. Menu 622 lists a number of selections related to a roadmap, such as the previously-loaded roadmap shown displayed in editing region 624, where a selection of menu 622, when chosen, can cause roadmap editor 620 to perform one or more operations related to the chosen selection.

FIG. 6A shows that menu 622 includes robot type selection 630, kinematics selection 632, load factor selection 634, get map selection 636, save map selection 638, more information selection 640a, inspect interaction regions 642, and exit selection 644. In other embodiments than those shown in FIGS. 6A and 6B, menu 622 can provide more, fewer, and/or different menu selections. In still other embodiments, other graphical elements, such as pull-down menus, icons, and/or dialogs can be used with and/or replace one or more selections of menu 622.

Robot type selection 630 can be used to specify, review, update, and/or delete an association between a class or type of robotic device and the roadmap. For example, type T1 and T2 robots can be associated with roadmap 300 in scenario 400. Then, if roadmap 300 were being edited using roadmap editor 620, robot type selection 630 can make the association between type T1 and T2 robots and roadmap 300.

Kinematics selection 632 can be used to specify, review, update, and/or delete one or more kinematic parameters related to motion or kinematics of a robotic device associated with part or all of the roadmap. Example kinematic parameters include, but are not limited to, parameters related to: maximum and/or minimum velocity or speed of a robotic device, maximum and/or minimum acceleration for the robotic device, maximum and/or minimum jerk (derivative of acceleration) for the robotic device, one or more masses of the robotic device, one or more weights of the robotic device, cargo capacity, and one or more coefficients of friction for the robotic device. In some embodiments, some or all of the kinematic parameters can be specified for a robotic device by specifying a type of the robotic device using robot type selection 630.

In other embodiments, kinematic parameters can be specified for a portion of the roadmap; e.g., one or more kinematic parameters specified for one or more particular intersections, edges, edge interaction regions, and/or edge non-interaction regions. The portion-specific parameters can replace and/or augment one or more kinematic parameters specified for all intersections, edges, edge interaction regions, and/or edge non-interaction regions. For example, a robot of type T1 can have a maximum velocity of V1 meters per second (m/s), and so associating robots of type T1 with the roadmap can set the maximum velocity for type T1 robots using the roadmap at V1 m/s. Then, roadmap editor 630 can be used to set a maximum velocity for all edge interaction regions of the roadmap to be V2 m/s, where V2 is less than V1, and to set a maximum velocity for a particular edge interaction region EIR1 to be V3 m/s, where V3 is less than V2. Then, a type T1 robotic device using this roadmap can be instructed to have a maximum velocity of: V1 m/s in edge non-interaction regions, V2 m/s in most edge interaction regions, and V3 in edge interaction region EIR1. In still other embodiments, other related parameters, such as, but not limited to, performance parameters/characteristics, different weights/masses, different parameters for and/or types of propulsion, and different parameters and/or actuators for movement, can be specified using kinematics selection 632. Many other examples are possible as well.

Load factor selection 634 can be used to specify a load factor, which can be an amount of cargo weight and/or mass planned for and/or actually carried by a robotic device while moving in an environment modeled by the roadmap. The load factor can be specified for a particular robotic device, a particular type of robotic device, and/or for part or all of a roadmap, such as discussed above in the context of kinematic selection 632. In some embodiments, one or more load factors can be specified as one or more kinematic parameters using kinematic selection 632.

Get map selection 636 can be used to retrieve a roadmap from data storage and load the retrieved roadmap into roadmap editor 620. Save map selection 638 can be used to store a roadmap currently loaded into roadmap editor 620 to data storage. For example, a roadmap can be stored in non-volatile data storage as one or more files, where non-volatile data storage is discussed below in the context of data storage 704 of FIG. 7A. Exit selection 644 can be used to terminate execution of roadmap editor 620; e.g., exit an application for roadmap editor 620.

Editing region 624 can be used to create, review, and update roadmaps. For example, roadmaps can be updated by creating, reviewing, updating, and/or deleting edges and/or intersections of a roadmap displayed in editing region 624. After creating, reviewing, and/or updating a roadmap, the roadmap can be saved to data storage for later use; e.g., using save map selection 638.

System bar 626 shows a triangle, circle, and square, which can be used to return to a previous application executed prior to roadmap editor 620 by selecting the triangle, return to a home screen by selecting the circle, and provide a listing of all executed applications by selecting the square. Graphical elements, such as a selection of menu 622, edges, intersections, edge interaction regions, and edge non-interaction regions of roadmaps shown in editing region 624, and the triangle, circle, and square of system bar 626, can be selected using a user input device of computing device 610. Example user input devices are described below in the context of user interface module 701 shown in FIG. 7A.

In scenario 600, roadmap editor 620 has loaded and displayed a roadmap, which is shown in part in editing region 624 of FIG. 6A. The roadmap includes edges 652, 654, 656, and 658 and intersections 660, 662, 664 and 666. FIG. 6A shows that edges 652 and 654 are horizontal edges, edges 656 and 658 are vertical edges, intersection 660 is at a point where edges 652 and 656 come together, intersection 662 is at a point where edges 652 and 656 come together, intersection 664 is at a point where edges 654 and 656 come together, and intersection 666 is at a point where edges 654 and 658 come together.

Scenario 600 continues with a selection of intersection 664. After intersection 664 is selected, roadmap editor 620 can generate and display selection indicator 672 surrounding intersection 664 to confirm that intersection 664 has been selected. Roadmap editor 620 can also update menu 622 upon selection of intersection 664 to add operations related to selected intersection 664.

FIG. 6A shows that menu 622 includes "Intersection 664 Selections" that include more information selection 640*a* and inspect interaction regions selection 642. In other embodiments, roadmap editor 620 can add more, fewer, and/or different selections to menu 622 for operations related to a selected intersection.

More information selection 640*a* can be used to display additional data about intersection 664—the additional data can include, but is not limited to, specific location information such as latitude/longitude coordinates for the intersection, kinematic and/or other parameters associated with the intersection, one or more names or labels associated with the intersection (e.g., "SlickFloor1"), and comments/notes for the intersection (e.g., "floor can be slick at this intersection"). In some embodiments, more information selections 640*a* and/or 640*b* can be used for updating, deleting, and/or inserting data as well as displaying data.

Inspect interaction regions selection 642 can be used to instruct roadmap editor 620 to display edge interaction regions and/or edge non-interaction regions associated with one or more selected edges and/or intersections.

In scenario 600, inspect interaction regions selection 642 is chosen to display edge interaction regions and edge non-interaction regions associated with selected intersection 664. In response, roadmap editor 620 updates a display of the roadmap provided in editing region 624 to include edge interaction regions and edge non-interaction regions associated with selected intersection 664.

FIG. 6B shows roadmap editor 620 after updating the roadmap to include display of edge interaction region 680 and edge non-interaction regions 682, 684, 686, and 688 associated with selected intersection 664. In particular, editing region 624 has been updated to display: edge interaction region 680 as a relatively-light gray circle around intersection 664, edge non-interaction regions 682 and 684 as relatively-dark gray rectangles on portions of edge 656, and edge non-interaction regions 686 and 688 as relatively-dark gray rectangles on portions of edge 654.

Scenario 600 then continues with selection of the edge interaction region associated with intersection 664—in response, roadmap editor 620 displays selection indicator 674 about edge interaction region 680. Roadmap editor 620 also updates menu 622 to replace previously-provided selections about intersection 664 with selections about edge interaction region 680. FIG. 6B shows that menu 622 includes "EIR 680 Selections" for edge interaction region 680 that include more info selection 640*b*, adjust edge interaction region selection 646, specify paths selection 648, assign agent planning software selection (APS) 690, and inspect rules selection 692. In other embodiments, roadmap editor 620 can add more, fewer, and/or different selections to menu 622 for operations related to a selected edge interaction region.

More information selection 640*b* can be used to display additional data about edge interaction region 680. The additional data can include, but is not limited to, specific location information such as latitude/longitude coordinates for the edge interaction region, kinematic parameters associated with the edge interaction region, one or more names or labels associated with the edge interaction region, and comments/notes for the edge interaction region.

Adjust edge interaction region selection 646 can be used to change a size and/or a shape of a selected edge interaction region. As one example, circular edge interaction region 680 can be resized to be a larger or smaller circle. As another edge interaction region 680 can be changed to be an elliptical, polygonal, and/or other shaped region. In some examples, edge interaction region 680 can be determined based on a combination of shapes; e.g., a union of ellipses and/or rectangles. Other examples for changing the size and/or shape of a selected edge interaction region are possible as well.

Specify paths selection 648 can be used for creating, reviewing, updating, and/or deleting one or more paths through a selected edge interaction region. The one or more paths through the selected edge interaction region can include, but are not limited to, paths in different directions through the selected edge interaction region, paths for one robotic device, paths for a convoy of robotic devices, paths based on a type of a robotic device, paths based on a load factor of a robotic device, and combinations thereof; e.g., a number of paths for a convoy of robotic devices having differing types and load factors and going in different directions through the selected edge interaction region. In particular embodiments, specify paths selection 648 can be used for creating, reviewing, updating, and/or deleting one or more paths that include directional edges, such as discussed above in the context of roadmap 500.

Assign agent planning software selection 690 can be used to assign agent planning software to a selected edge interaction region. For example, a first set of multiple agent planning software (perhaps a default set) can be assigned to the selected edge interaction region. Then, when a second set of multiple agent planning software is available; e.g., a new version of the first multiple agent planning software or a different multiple agent planning software package, assign agent planning software selection 690 can be used to assign the second set of multiple agent planning software to guide through the selected edge interaction region.

In other examples where one or more edge non-interaction regions are selected, a first set of single agent planning software can be assigned to the edge non-interaction region(s). Then, when second set of single agent planning software is available, assign agent planning software selection 690 can be used to assign the second set of single agent planning software to guide through the selected edge non-interaction region(s). Other examples of assigning agent planning software to regions of a roadmap are possible as well.

In some examples, more than one set of multiple and/or single agent planning software can be associated with a roadmap. For example, a first set of multiple and/or single agent planning software can be associated with one or more regions of the roadmap. Then, when a second set of multiple and/or single agent planning software becomes available, the second set of multiple and/or single agent planning software can be assigned to a subset of the one or regions of the roadmap; e.g., for testing and/or evaluation of the second set of multiple and/or single agent planning software in a relatively small region of the roadmap until it is determined that the second set of multiple and/or single agent planning software can be used throughout the roadmap.

Inspect rules selection 692 can be used to review, insert, delete, and/or change one or more rules of a rule set associated with a selected edge interaction region. The rule set can be specified based on selected agent planning software, perhaps selected using assign agent planning selection 690. The rule set can include, but is not limited to one or more rules related to: kinematic parameters of robotic devices while in the edge interaction region, precedence of robotic devices traveling through the edge interaction region, and assigning edge states of edges in the edge interaction region (e.g., states such as available, unavailable, and deactivating discussed in the context of scenario 400).

In some examples, the rule set can include rules related to other aspects of the roadmap than the selected edge interaction region; e.g., other edge interaction regions, edge non-interaction regions, edges, and/or intersections.

Other models of intersections, edges, and roadmaps are possible as well. In some embodiments, specific intersections (or other locations) for inspecting edges may not be used; rather, a model, such as a kinematic model, of a robotic device can be used to determine one or more locations where the robotic device should examine an edge state to provide enough distance to stop, if necessary, before blocking an intersection. In other embodiments, more types of robotic devices are possible as well.

Computing Device Architecture

Figure 7A:
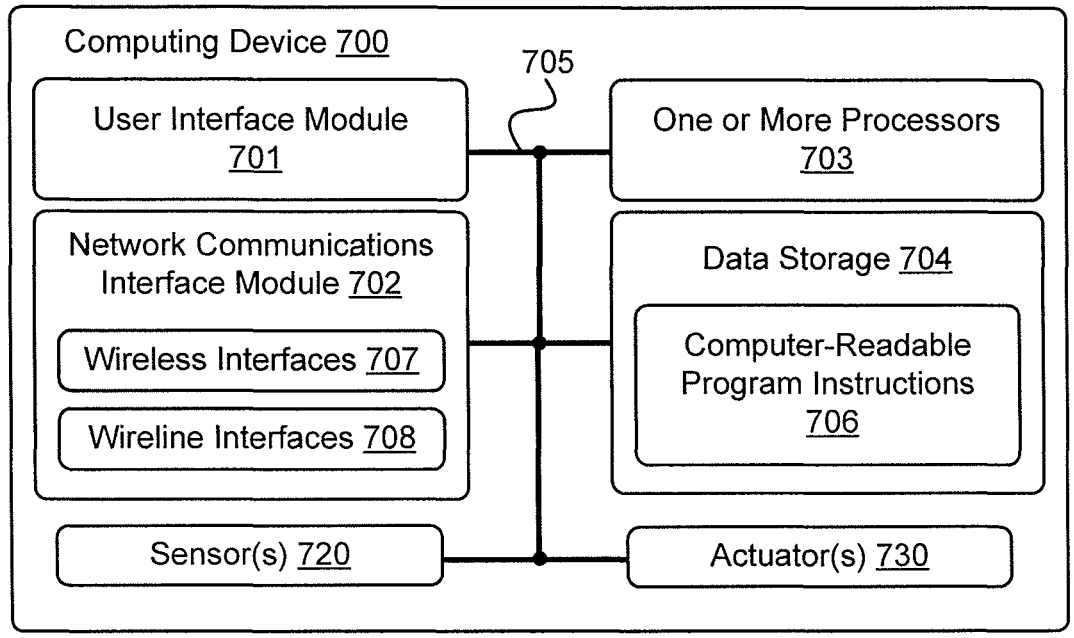
FIG. 7A is a functional block diagram of an example computing device, in accordance with an example embodiment.

FIG. 7A is a functional block diagram of computing device 700 (e.g., system, in accordance with an example embodiment. In particular, computing device 700 shown in FIG. 7A can be configured to perform at least one function of robotic devices 130, 132, 134, 136, 138, 140, 142, 144, 146, 532, 534, 536, 538, convoy 402, computing device 610, roadmap editor 620, single agent planning software, multiple agent planning software, a routing computing device, and network 714 and/or at least one function related to roadmaps 200, 300, 500, scenarios 350, 400 and method 800. Computing device 700 may include a user interface module 701, a network-communication interface module 702, one or more processors 703, data storage 704, one or more sensors 720, and one or more actuators 730, all of which may be linked together via a system bus, network, or other connection mechanism 705. In some embodiments, computing device 700 can be configured to act as part or all of a warehouse control system.

User interface module 701 can be operable to send data to and/or receive data from external user input/output devices. For example, user interface module 701 can be configured to send and/or receive data to and/or from user input devices such as a keyboard, a keypad, a touch screen, a computer mouse, a track ball, a joystick, a camera, a voice recognition module, and/or other similar devices. User interface module 701 can also be configured to provide output to user display devices, such as one or more cathode ray tubes (CRT), liquid crystal displays, light emitting diodes (LEDs), displays using digital light processing (DLP) technology, printers, light bulbs, and/or other similar devices, either now known or later developed. User interface module 701 can also be configured to generate audible output(s), such as a speaker, speaker jack, audio output port, audio output device, earphones, and/or other similar devices.

Network-communications interface module 702 can include one or more wireless interfaces 707 and/or one or more wireline interfaces 708 that are configurable to communicate via a network. Wireless interfaces 707 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 708 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 702 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 703 can include one or more general purpose processors, and/or one or more special purpose processors (e.g., digital signal processors, graphics processing units, application specific integrated circuits, etc.). Processors 703 can be configured to execute computer-readable program instructions 706 that are contained in the data storage 704 and/or other instructions as described herein.

Data storage 704 can include one or more computer-readable storage media that can be read and/or accessed by at least one of processors 703. The one or more computer-readable storage media can include volatile and/or non-volatile storage components, such as optical, magnetic, organic or other memory or disc storage, which can be integrated in whole or in part with at least one of processors 703. In some embodiments, data storage 704 can be implemented using a single physical device (e.g., one optical, magnetic, organic or other memory or disc storage unit), while in other embodiments, data storage 704 can be implemented using two or more physical devices.

Data storage 704 can include computer-readable program instructions 706 and perhaps additional data. In some embodiments, data storage 704 can additionally include storage required to perform at least part of the herein-described methods and techniques and/or at least part of the functionality of the devices and networks.

In some embodiments, computing device 700 can include one or more sensors 720. Sensor(s) 720 can be configured to measure conditions in an environment for computing device 700 and provide data about that environment; e.g., environment 100. For example, sensor(s) 720 can include one or more of: (i) an identification sensor to identify other objects and/or devices, such as, but not limited to, an RFID reader, proximity sensor, one-dimensional barcode reader, two-dimensional barcode (e.g., Quick Response (QR) code) reader, and a laser tracker, where the identification sensor(s) can be configured to read identifiers, such as RFID tags, barcodes, QR codes, and/or other devices and/or object configured to be read and provide at least identifying information; (ii) a location sensor to measure locations and/or movements of the computing device 700, such as, but not limited to, a gyroscope, an accelerometer, a Doppler sensor, a Global Positioning System (GPS) device, a sonar sensor, a radar device, a laser-displacement sensor, and a compass; (iii) an environmental sensor to obtain data indicative of an environment of computing device 700, such as, but not limited to, an infrared sensor, an optical sensor, a light sensor, a camera, a biosensor, a capacitive sensor, a touch sensor, a temperature sensor, a wireless sensor, a radio sensor, a movement sensor, a microphone, a sound sensor, an ultrasound sensor, and/or a smoke sensor; and (iv) a force sensor to measure one or more forces (e.g., inertial forces and/or G-forces) acting about the computing device 700, such as, but not limited to one or more sensors that measure: forces in one or more dimensions, torque, ground force, friction, and/or a zero moment point (ZMP) sensor that identifies ZMPs and/or locations of the ZMPs. Many other examples of sensor(s) 720 are possible as well.

Computing device 700 can include one or more actuators 730 that enable computing device 700 to initiate movement. For example, actuator(s) 730 can include or be incorporated with robotic joints connecting robotic limbs to a robotic body. For example, actuator(s) 730 can include respective robotic hip and robotic shoulder joints connecting respective robotic legs and arms to the robotic body. Further, the actuator(s) 730 can include respective robotic knee joints connecting respective portions of the robotic legs (e.g., robotic thighs and robotic calves) and elbow joints connecting portions of the robotic arms (e.g., robotic forearms and upper arms). Yet further, actuator(s) 730 can include respective robotic ankle joints connecting the robotic legs to robotic feet and respective robotic wrist joints connecting the robotic arms to robotic hands. In addition, actuator(s) 730 can include motors for moving the robotic limbs. As such, the actuator(s) 730 can enable mobility of computing device 700. Many other examples of actuator(s) 730 are possible as well.

Cloud-Based Servers

Figure 7B:
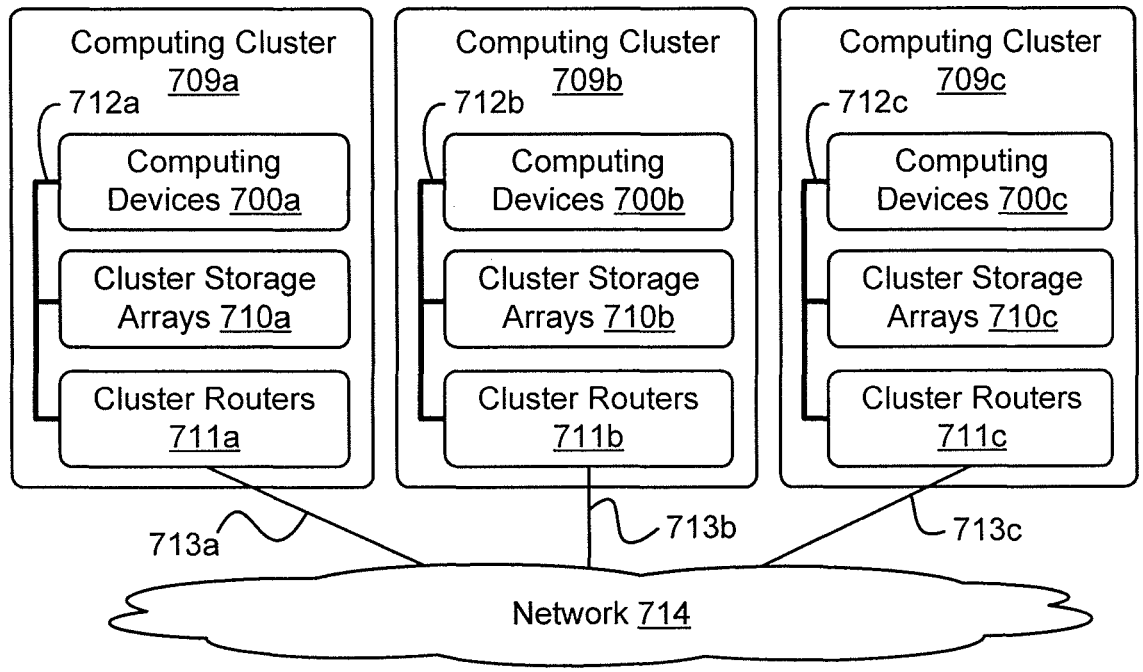
FIG. 7B depicts a network of computing clusters arranged as a cloud-based server system, in accordance with an example embodiment.

FIG. 7B depicts a network 714 of computing clusters 709a, 709b, 709c arranged as a cloud-based server system in accordance with an example embodiment. Computing clusters 709a, 709b, 709c can be cloud-based devices that store program logic and/or data of cloud-based applications and/or services; e.g., perform at least one function of robotic devices 130, 132, 134, 136, 138, 140, 142, 144, 146, 532, 534, 536, 538, convoy 402, computing device 610, roadmap editor 620, single agent planning software, multiple agent planning software, a routing computing device, and network 714 and/or at least one function related to roadmaps 200, 300, 500, scenarios 350, 400 and method 800.

In some embodiments, computing clusters 709a, 709b, 709c can be a single computing device residing in a single computing center. In other embodiments, computing clusters 709a, 709b, 709c can include multiple computing devices in a single computing center, or even multiple computing devices located in multiple computing centers located in diverse geographic locations. For example, FIG. 7B depicts each of computing clusters 709a, 709b, 709c residing in different physical locations.

In some embodiments, data and services at computing clusters 709a, 709b, 709c can be encoded as computer readable information stored in non-transitory, tangible computer readable media (or computer readable storage media) and accessible by other computing devices. In some embodiments, computing clusters 709a, 709b, 709c can be stored on a single disk drive or other tangible storage media, or can be implemented on multiple disk drives or other tangible storage media located at one or more diverse geographic locations.

FIG. 7B depicts a cloud-based server system in accordance with an example embodiment. In FIG. 7B, functionality of a safety system can be distributed among three computing clusters 709a, 709b, and 709c. Computing cluster 709a can include one or more computing devices 700a, cluster storage arrays 710a, and cluster routers 711a connected by a local cluster network 712a. Similarly, computing cluster 709b can include one or more computing devices 700b, cluster storage arrays 710b, and cluster routers 711b connected by a local cluster network 712b. Likewise, computing cluster 709c can include one or more computing devices 700c, cluster storage arrays 710c, and cluster routers 711c connected by a local cluster network 712c.

In some embodiments, each of the computing clusters 709a, 709b, and 709c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 709a, for example, computing devices 700a can be configured to perform various computing tasks of a roadmap editor, single agent planning software, multiple agent planning software, a routing computing device, and/or a computing device. In one embodiment, the various functionalities of a roadmap editor, single agent planning software, multiple agent planning software, a routing computing device, and/or a computing device can be distributed among one or more computing devices 700a, 700b, and 700c. Computing devices 700b and 700c in respective computing clusters 709b and 709c can be configured similarly to computing devices 700a in computing cluster 709a. On the other hand, in some embodiments, computing devices 700a, 700b, and 700c can be configured to perform different functions.

In some embodiments, computing tasks and stored data associated with a roadmap editor, single agent planning software, multiple agent planning software, a routing computing device, and/or a computing device can be distributed across computing devices 700a, 700b, and 700c based at least in part on the processing requirements of a roadmap editor, single agent planning software, multiple agent planning software, a routing computing device, and/or a computing device, the processing capabilities of computing devices 700a, 700b, and 700c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 710a, 710b, and 710c of the computing clusters 709a, 709b, and 709c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of a roadmap editor, single agent planning software, multiple agent planning software, a routing computing device, and/or a computing device can be distributed across computing devices 700a, 700b, and 700c of computing clusters 709a, 709b, and 709c, various active portions and/or backup portions of these components can be distributed across cluster storage arrays 710a, 710b, and 710c. For example, some cluster storage arrays can be configured to store one portion of the data of a roadmap editor, single agent planning software, multiple agent planning software, a routing computing device, and/or a computing device can, while other cluster storage arrays can store other portion(s) of data of a roadmap editor, single agent planning software, multiple agent planning software, a routing computing device, and/or a computing device. Additionally, some cluster storage arrays can be configured to store backup versions of data stored in other cluster storage arrays.

The cluster routers 711a, 711b, and 711c in computing clusters 709a, 709b, and 709c can include networking equipment configured to provide internal and external communications for the computing clusters. For example, the cluster routers 711a in computing cluster 709a can include one or more internet switching and routing devices configured to provide (i) local area network communications between the computing devices 700a and the cluster storage arrays 710a via the local cluster network 712a, and (ii) wide area network communications between the computing cluster 709a and the computing clusters 709b and 709c via the wide area network connection 713a to network 714. Cluster routers 711b and 711c can include network equipment similar to the cluster routers 711a, and cluster routers 711b and 711c can perform similar networking functions for computing clusters 709b and 709b that cluster routers 711a perform for computing cluster 709a.

In some embodiments, the configuration of the cluster routers 711a, 711b, and 711c can be based at least in part on the data communication requirements of the computing devices and cluster storage arrays, the data communications capabilities of the network equipment in the cluster routers 711a, 711b, and 711c, the latency and throughput of local networks 712a, 712b, 712c, the latency, throughput, and cost of wide area network links 713a, 713b, and 713c, and/or other factors that can contribute to the cost, speed, fault-tolerance, resiliency, efficiency and/or other design criteria of the moderation system architecture.

Example Methods of Operation

Figure 8:
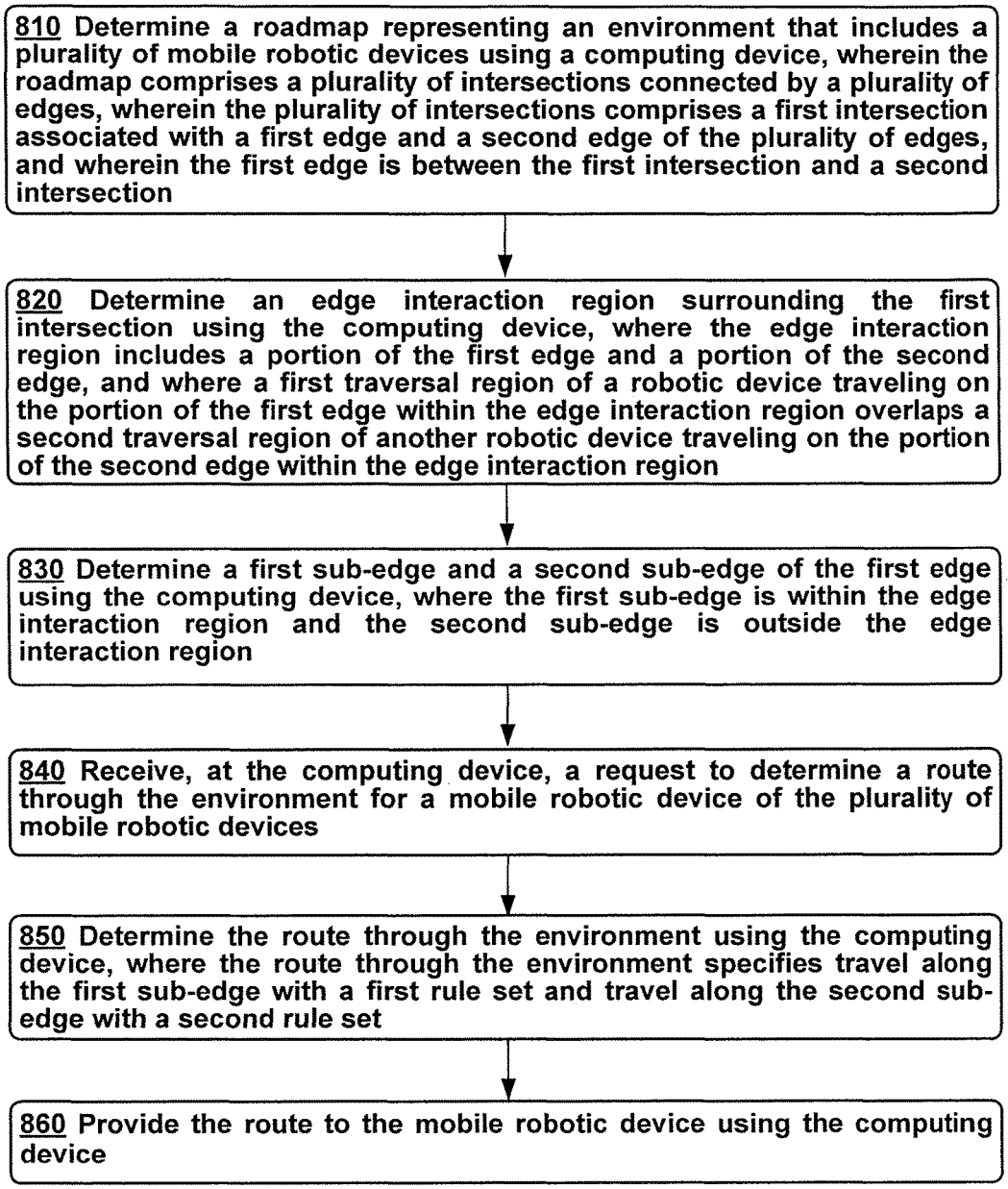
FIG. 8 is a flowchart of a method, in accordance with an example embodiment.

FIG. 8 is a flowchart of method 800, in accordance with an example embodiment. Method 800 can be executed by a computing device, such as computing device 700. Method 800 can begin at block 810, where a computing device can determine a roadmap representing an environment, where the environment can include a plurality of mobile robotic devices, where the roadmap can include a plurality of intersections connected by a plurality of edges, where the plurality of intersections includes a first intersection associated with a first edge and a second edge of the plurality of edges, and where the first edge is between the first intersection and a second intersection, such as discussed above regarding as least FIGS. 1-6B. In some embodiments, at least one of the first edge and the second edge is a directed edge, such as discussed above regarding as least FIG. 5.

At block 820, the computing device can determine an edge interaction region surrounding the first intersection, where the edge interaction region includes a portion of the first edge and a portion of the second edge, and where a first traversal region of a robotic device traveling on the portion of the first edge within the edge interaction region overlaps a second traversal region of another robotic device traveling on the portion of the second edge within the edge interaction region, such as discussed above regarding as least FIGS. 2-5 and 6B. In some embodiments, determining the edge interaction region can include determining whether the first traversal region collides with the second traversal region; after determining that the first traversal region collides with the second traversal region: determining a first intersection point where the first traversal region and the second traversal region initially collide, and determining a second point where the first traversal region and the second traversal region stop colliding; and determining the edge interaction region based on a portion of the first traversal region between the first point and the second point, such as discussed above regarding as least FIG. 2.

At block 830, the computing device can determine a first sub-edge and a second sub-edge of the first edge, where the first sub-edge is within the edge interaction region and the second sub-edge is outside the edge interaction region, such as discussed above regarding as least FIGS. 3B, 3C, 4B, 5, and 6B. In some embodiments, the second sub-edge can have a particular state, where the particular state of the second edge includes one of: an available state, an unavailable state, and a deactivating state, such as discussed above regarding as least FIGS. 4A and 4B. In particular of these embodiments, the mobile robotic device can be traveling in a first portion of the environment represented by the first sub-edge in a direction toward a second portion of the environment represented by the second sub-edge; the mobile robotic device can be configured to stop at or before the first point on the first edge if the particular state of the second sub-edge includes the occupied state, and the mobile robotic device can be configured to proceed to the second portion of the environment if the particular state of the second sub-edge includes the available state, such as discussed above regarding as least FIGS. 4A and 4B.

In other particular of these embodiments, the mobile robotic device can be associated with a convoy of mobile robotic devices, and the mobile robotic device can be configured to stop at or before the first point if the particular state of the second sub-edge includes the deactivating state and if robotic devices in the convoy are absent from the portion of the environment represented by the second sub-edge, such as discussed above regarding as least FIGS. 4A and 4B. In still other particular of these embodiments, the mobile robotic device can be associated with a convoy of mobile robotic devices, and the mobile robotic device can be configured to proceed to a second portion of the environment represented by the second sub-edge if the particular state of the second sub-edge includes the deactivating state and if one or more robotic devices of the convoy are present in the second portion of the environment, such as discussed above regarding as least FIGS. 4A and 4B.

At block 840, the computing device can receive a request to determine a route through the environment for a mobile robotic device of the plurality of mobile robotic devices, such as discussed above in the context of at least FIGS. 3C and 5.

At block 850, the computing device can determine the route through the environment using the computing device, where the route through the environment specifies travel along the first sub-edge with a first rule set and travel along the second sub-edge with a second rule set, such as discussed above in the context of at least FIGS. 3C and 5. In some embodiments, the second rule set can include one or more rules regarding maintaining a minimum following distance between the robotic device and a robotic device preceding the robotic device, such as discussed above in the context of at least FIGS. 3C and 4A. In other embodiments, the first rule set can include one or more rules directing the mobile robotic device to: stop before reaching a portion of the environment corresponding to the first sub-edge if the particular state of the first sub-edge comprises the unavailable state, and proceed to the portion of the environment corresponding to the first sub-edge if the particular state of the first sub-edge comprises the available state, such as discussed above in the context of FIG. 4A.

In still other embodiments, the mobile robotic device can be associated with a convoy of mobile robotic devices. Then, the second rule set can include one or more rules directing the mobile robotic device to: stop before reaching a portion of the environment corresponding to the first sub-edge if the particular state of the first sub-edge comprises the deactivating state and if robotic devices in the convoy are absent from the portion of the environment represented by the first sub-edge; and proceed to the portion of the environment represented by the first sub-edge if the particular state of the first sub-edge comprises the deactivating state and if one or more robotic devices of the convoy are present in the portion of the environment corresponding to the first sub-edge, such as discussed above in the context of FIG. 4A.

At block 860, the computing device can provide the route to the mobile robotic device, such as discussed above in the context of at least FIGS. 3C and 5.

In some embodiments, method 800 can further include: providing the roadmap using a user interface of the computing device, wherein the user interface enables modification of the edge interaction region, such as discussed above in the context of at least FIGS. 6A and 6B.

In other embodiments, the mobile robotic device can be part of a convoy of mobile robotic devices, where the convoy of mobile robotic devices can include two or more of the plurality of mobile robotic devices, where the two or more robotic devices in the convoy can include a lead robotic device and one or more other convoying robotic devices, and where the one or more other convoying robotic devices can be instructed to follow the lead robotic device, such as discussed above in the context of at least FIGS. 4A and 4B. In particular of these embodiments, the lead robotic device of the convoy can take a first path through the first intersection, where at least a second-lead robotic device of the convoy can take a second path through the first intersection, and where the first path can differ from the second path, such as discussed above in the context of at least FIGS. 4A and 4B. In more particular of these embodiments, where the convoy can divide into at least a first sub-convoy and a second sub-convoy at the particular intersection, where the first sub-convoy can include the lead robotic device, and where the second sub-convoy can include the second-lead robotic device, such as discussed above in the context of at least FIGS. 4A and 4B.

In still other embodiments, the route for the mobile robotic device includes the first sub-edge and the second sub-edge. Then, method 800 can further include: directing the mobile robotic device along the first sub-edge using multiple agent planning software applying the first rule set; and directing the mobile robotic device along the second sub-edge using single agent planning software applying the second rule set, such as discussed above in the context of at least FIG. 5.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as non-transitory computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for provided for explanatory purposes and are not intended to be limiting, with the true scope being indicated by the following claims.

What is claimed is:

1. A method, comprising:
 determining, for a roadmap comprising a plurality of edges, a plurality of edge interaction regions and a plurality of edge non-interaction regions, wherein the plurality of edge interaction regions comprise regions in which traversal regions of two robotic devices on respective edges of the plurality of edges overlap, and wherein the plurality of edge non-interaction regions comprises regions in which traversal regions of two robotic devices on respective edges of the plurality of edges do not interact;

determining, for a robotic device, a route along one or more edges from the plurality of edges of the roadmap; and providing instructions to cause the robotic device to navigate along the route, wherein the instructions cause the robotic device to use at least one sensor on the robotic device to follow a preceding robotic device along the route when the robotic device is in an edge non-interaction region, wherein the instructions cause the robotic device to request permission before entering an edge interaction region, and wherein the instructions cause the robotic device to navigate along the route without transmitting location information of the robotic device to a controller external to the robotic device.

2. The method of claim 1, wherein the traversal regions of the two robotic devices correspond to footprints of the two robotic devices.

3. The method of claim 1, further comprising adding a plurality of intersections to the roadmap, wherein each added intersection corresponds to a point between an edge interaction region and an edge non-interaction region.

4. The method of claim 1, wherein the instructions cause the robotic device to be controlled by single agent planning software in an edge non-interaction region and by multiple agent planning software before entering an edge interaction region.

5. The method of claim 1, further comprising providing a minimum following distance to the robotic device for travel within each edge non-interaction region.

6. The method of claim 1, further comprising providing a maximum velocity to the robotic device for travel within each edge interaction region.

7. The method of claim 1, wherein the plurality of edges are directed edges, and wherein the route along the one or more edges is based on directions of the one or more edges.

8. The method of claim 1, further comprising providing instructions to cause at least one other robotic device to follow the robotic device into one or more edge interaction regions as part of a convoy.

9. The method of claim 1, further comprising determining, for each edge interaction region, a state comprising one of: an available state, an unavailable state, or a deactivating state.

10. The method of claim 9, further comprising causing the robotic device to:
stop before entering an edge interaction region if the state of the edge interaction region comprises the unavailable state, and
proceed to enter the edge interaction region if the state of the edge interaction region comprises the available state.

11. The method of claim 1, further comprising providing the roadmap for display on a user interface, wherein the user interface enables modification of the plurality of edge interaction regions.

12. The method of claim 1, wherein the instructions further cause the robotic device to not use the at least one sensor on the robotic device to follow a preceding robotic device into the edge interaction region prior to receiving permission to enter the edge interaction region.

13. The method of claim 1, wherein when the robotic device is in an edge interaction region, the instructions cause the robotic device to travel through the edge interaction region without using the at least one sensor on the robotic device to follow a preceding robotic device through the edge interaction region.

14. A method, comprising:
determining, for a roadmap comprising a plurality of edges, a plurality of edge interaction regions and a plurality of edge non-interaction regions, wherein the plurality of edge interaction regions comprise regions in which traversal regions of two robotic devices on respective edges of the plurality of edges overlap, and wherein the plurality of edge non-interaction regions comprises regions in which traversal regions of two robotic devices on respective edges of the plurality of edges do not interact;
determining, for each of the plurality of edge interaction regions, a state comprising one of:
an available state, an unavailable state, or a deactivating state;
determining, for a robotic device, a route along one or more edges from the plurality of edges of the roadmap, wherein the robotic device is associated with a convoy of mobile robotic devices; and
providing instructions to cause the robotic device to:
navigate along the route,
use at least one sensor on the robotic device to follow a preceding robotic device in the convoy of mobile robotic devices along the route when the robotic device is in an edge non-interaction region,
stop before reaching an edge interaction region if the state of the edge interaction region comprises the deactivating state and if robotic devices in the convoy are absent from the edge interaction region; and
proceed to enter the edge interaction region if the state of the edge interaction comprises the deactivating state and if one or more robotic devices of the convoy are present in the edge interaction region.

15. A computing device, comprising:
one or more processors; and
data storage including at least computer-executable instructions stored thereon that, when executed by the one or more processors, cause the computing device to perform functions comprising:
determining, for a roadmap comprising a plurality of edges, a plurality of edge interaction regions and a plurality of edge non-interaction regions, wherein the plurality of edge interaction regions comprise regions in which traversal regions of two robotic devices on respective edges of the plurality of edges overlap, and wherein the plurality of edge non-interaction regions comprises regions in which traversal regions of two robotic devices on respective edges of the plurality of edges do not interact;
determining, for a robotic device, a route along one or more edges from the plurality of edges of the roadmap; and
providing instructions to cause the robotic device to use at least one sensor on the robotic device to follow a preceding robotic device along the route when the robotic device is in an edge non-interaction region, wherein the instructions cause the robotic device to request permission before entering an edge interaction region, and wherein the instructions cause the robotic device to navigate along the route without transmitting location information of the robotic device to a controller external to the robotic device.

16. The computing device of claim 15, further comprising a user interface, wherein the functions further comprise displaying the roadmap on the user interface, wherein the user interface enables modification of the plurality of edge interaction regions.

17. The computing device of claim 16, wherein the user interface enables setting of a maximum velocity for robots within the plurality of edge interaction regions.

18. A non-transitory computer readable medium having stored thereon instructions, that when executed by one or more processors of a computing device, cause the computing device to perform functions comprising:
   determining, for a roadmap comprising a plurality of edges, a plurality of edge interaction regions and a plurality of edge non-interaction regions, wherein the plurality of edge interaction regions comprise regions in which traversal regions of two robotic devices on respective edges of the plurality of edges overlap, and wherein the plurality of edge non-interaction regions comprises regions in which traversal regions of two robotic devices on respective edges of the plurality of edges do not interact;
   determining, for a robotic device, a route along one or more edges from the plurality of edges of the roadmap; and
   providing instructions to cause the robotic device to use at least one sensor on the robotic device to follow a preceding robotic device along the route when the robotic device is in an edge non-interaction region, wherein the instructions cause the robotic device to request permission before entering an edge interaction region, and wherein the instructions cause the robotic device to navigate along the route without transmitting location information of the robotic device to a controller external to the robotic device.

19. The non-transitory computer readable medium of claim 18, wherein the traversal regions of the two robotic devices correspond to footprints of the two robotic devices.

20. The non-transitory computer readable medium of claim 18, the functions further comprising:
   receiving the roadmap; and
   adding a plurality of intersections to the roadmap, wherein each added intersection corresponds to a point between an edge interaction region and an edge non-interaction region.

21. The non-transitory computer readable medium of claim 18, wherein the instructions cause the robotic device to be controlled by single agent planning software in an edge non-interaction region and by multiple agent planning software before entering an edge interaction region.

22. The non-transitory computer readable medium of claim 18, wherein the functions further comprise providing a minimum following distance to the robotic device for travel within each edge non-interaction region.

23. A method, comprising:
   determining, for a roadmap comprising a plurality of edges, a plurality of edge interaction regions and a plurality of edge non-interaction regions, wherein the plurality of edge interaction regions comprise regions in which traversal regions of two robotic devices on respective edges of the plurality of edges overlap, and wherein the plurality of edge non-interaction regions comprises regions in which traversal regions of two robotic devices on respective edges of the plurality of edges do not interact;
   determining, for a robotic device, a route along one or more edges from the plurality of edges of the roadmap; and
   providing instructions to cause the robotic device to navigate along the route, wherein the instructions cause the robotic device to use at least one sensor on the robotic device to follow a preceding robotic device along the route when the robotic device is in an edge non-interaction region, wherein using at least one sensor on the robotic device to follow a preceding robotic device along the route comprises using only the at least one sensor on the robotic device to follow the preceding robotic device along the route, and wherein the instructions cause the robotic device to request permission before entering an edge interaction region.

* * * * *